(12) United States Patent
Nakagata et al.

(10) Patent No.: US 9,407,934 B2
(45) Date of Patent: Aug. 2, 2016

(54) IMAGE EVALUATION APPARATUS AND METHOD

(71) Applicant: FUJITSU LIMITED, Kawasaki-shi, Kanagawa (JP)

(72) Inventors: Shohei Nakagata, Kawasaki (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 162 days.

(21) Appl. No.: 14/263,128

(22) Filed: Apr. 28, 2014

(65) Prior Publication Data

US 2014/0376820 A1    Dec. 25, 2014

(30) Foreign Application Priority Data

Jun. 20, 2013  (JP) ................. 2013-129987

(51) Int. Cl.
*H04N 19/40* (2014.01)
*H04N 19/86* (2014.01)

(52) U.S. Cl.
CPC ............. *H04N 19/86* (2014.11); *H04N 19/40* (2014.11)

(58) Field of Classification Search
None
See application file for complete search history.

(56) References Cited

U.S. PATENT DOCUMENTS

2006/0276983 A1   12/2006  Okamoto et al.
2011/0013844 A1   1/2011   Yamada

FOREIGN PATENT DOCUMENTS

| JP | 06-133176 | 5/1994 |
|---|---|---|
| JP | 06-233013 | 8/1994 |
| JP | 07-184062 | 7/1995 |
| JP | 2795147 | 9/1998 |
| WO | WO2005/020592 | 3/2005 |
| WO | WO2009/133884 | 11/2009 |

OTHER PUBLICATIONS

Luis H.A. Lourenco, Daniel Weingaertner, and Eduardo Todt, "Efficient Implementation of Canny Edge Detection Filter for ITK Using CUDA", 2012 IEEE, 13$^{th}$ Symposium on Computing Systems, pp. 33-40.*

* cited by examiner

*Primary Examiner* — Siamak Harandi

(74) *Attorney, Agent, or Firm* — Staas & Halsey LLP

(57) ABSTRACT

An evaluation apparatus includes: a memory; and a processor coupled to the memory and configured to calculate a first feature by calculating a first-order difference for a first image, calculate a second feature by calculating a second-order difference for the first image, calculate a third feature by calculating a first-order difference for a second image, calculate a fourth feature by calculating a second-order difference for the second image, and evaluate deterioration of the second image with respect to the first image according to a first simultaneous distribution that represents a first relationship between the first feature and the second feature and to a second simultaneous distribution that represents a second relationship between the third feature and the fourth feature.

14 Claims, 17 Drawing Sheets

IMAGE EVALUATION APPARATUS AND METHOD

CROSS-REFERENCE TO RELATED APPLICATION

This application is based upon and claims the benefit of priority of the prior Japanese Patent Application No. 2013-129987, filed on Jun. 20, 2013, the entire contents of which are incorporated herein by reference.

FIELD

The embodiments discussed herein are related to an evaluation apparatus and an evaluation method.

BACKGROUND

As smartphones, tablet personal computers (PCs), and other devices that can easily display a video have been widely used and a network environment to distribute videos has been fully improved, there have been an increasing number of opportunities to distribute video content in various forms. To distribute a video to various devices, the video is transcoded to forms corresponding to individual devices. Video quality may be lowered during the transcoding or distribution of the video, or the video may be destructed due to, for example, an error during video distribution. Accordingly, the video quality is checked before the video is displayed.

In one method of checking video quality, a person visually checks pieces of distributed content one by one. This method involves enormous human costs and burdens and imposes a physical limit when a large amount of content is checked. In view of this, there is a desire for technology that automatically evaluates video quality and thereby substantially reduces human tasks.

There are three types of methods of automatically evaluating video quality; a full reference (FR) method, in which all original videos before deterioration and all deteriorated videos are used, a reduced reference (RR) method, in which the features of two videos are compared, and a non-reference (NR) method, in which only deteriorated videos are used. The FR method enables quality to be highly precisely inferred because all information of a video is used, but is disadvantageous in that much processing time is taken.

The RR method enables quality to be inferred in less processing time than the FR method because the features of videos are compared. However, inference precision is lower than in the FR method accordingly. The NR method takes the least processing time among the three methods because only deteriorated videos are used for evaluation. However, it is generally said that inference precision in the NR method is the lowest among the three methods.

A conventional RR method will now be described. FIG. 15 illustrates the conventional RR method. In the example in FIG. 15, a feature creating unit $10a$, a feature creating unit $10b$, and a calculating unit 11 are included. The feature creating unit $10a$ creates a feature from an original video $1a$ and outputs the created feature to the calculating unit 11. The feature creating unit $10b$ creates a feature from a deteriorated video $1b$ and outputs the created feature to the calculating unit 11. The calculating unit 11 calculates a difference between the feature received from the feature creating unit $10a$ and the feature received from the feature creating unit $10b$ and outputs the calculation result as an evaluation value $1c$.

Next, a conventional technology that uses a RR method will be described. The conventional technology evaluates video quality by using the amount of edges in a video and changes in statistic S of image differences in the time direction. For example, the conventional technology obtains three evaluation values that represent the degree of an increase or a decrease in image edges, the degree of the strength of block noise, and the degree of image deterioration in the time direction.

FIG. 16 illustrates the conventional technology that uses a RR method. In the example in FIG. 16, a feature creating unit $30a$, a feature creating unit $30b$, and a calculating unit $30c$ are included. The feature creating unit $30a$ obtains of the distribution of a first feature, the distribution of a second feature, and the distribution of a third feature from the original video $1a$. The feature creating unit $30a$ obtains statistics from the distributions of the first to third features and obtains a first deterioration feature, a second deterioration feature, and a third deterioration feature from the obtained statistics. The feature creating unit $30a$ then outputs the first to third deterioration features to the calculating unit $30c$.

The feature creating unit $30b$ obtains the distribution of the first feature, the distribution of the second feature, and the distribution of the third feature from the deteriorated video $1b$. The feature creating unit $30b$ obtains statistics from the distributions of the first to third features and obtains a first deterioration feature, a second deterioration feature, and a third deterioration feature from the obtained statistics. The feature creating unit $30b$ then outputs the first to third deterioration features to the calculating unit $30c$.

The calculating unit $30c$ calculates an evaluation value $2a$, an evaluation value $2b$, and an evaluation value $2c$ from the first to third deterioration features received from the feature creating unit $30a$ and from the first to third deterioration features received from the feature creating unit $30b$. Specifically, the calculating unit $30c$ calculates the evaluation value $2a$ from the first deterioration feature received from the feature creating unit $30a$ and from the first deterioration feature received from creating unit $30b$; the calculating unit $30c$ calculates the evaluation value $2b$ from the second deterioration features received from the feature creating unit $30a$ and from the second deterioration feature received from creating unit $30b$; and the calculating unit $30c$ calculates the evaluation value $2c$ from the third deterioration features received from the feature creating unit $30a$ and from the third deterioration feature received from creating unit $30b$. For example, the evaluation value $2a$ represents the degree of an increase or a decrease in image edges, the evaluation value $2b$ represents the degree of the strength of block noise, and the evaluation value $2c$ represents the degree of image deterioration in the time direction.

The above technology is disclosed in, for example, Japanese Laid-open Patent Publication No. 6-133176, Japanese Laid-open Patent Publication No. 6-233013, International Publication Pamphlet No. WO 2009/133884, and Japanese Patent No. 2795147.

SUMMARY

According to an aspect of the invention, an evaluation apparatus includes: a memory; and a processor coupled to the memory and configured to calculate a first feature by calculating a first-order difference for a first image, calculate a second feature by calculating a second-order difference for the first image, calculate a third feature by calculating a first-order difference for a second image, calculate a fourth feature by calculating a second-order difference for the second image, and evaluate deterioration of the second image with respect to the first image according to a first simultaneous distribution that represents a first relationship between the first feature and the second feature and to a second simultaneous distribution that represents a second relationship between the third feature and the fourth feature.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The conventional technology described above is problematic in that it is difficult to use a desired quality parameter to evaluate deterioration caused during conversion of image data included in video data.

Figure 16:
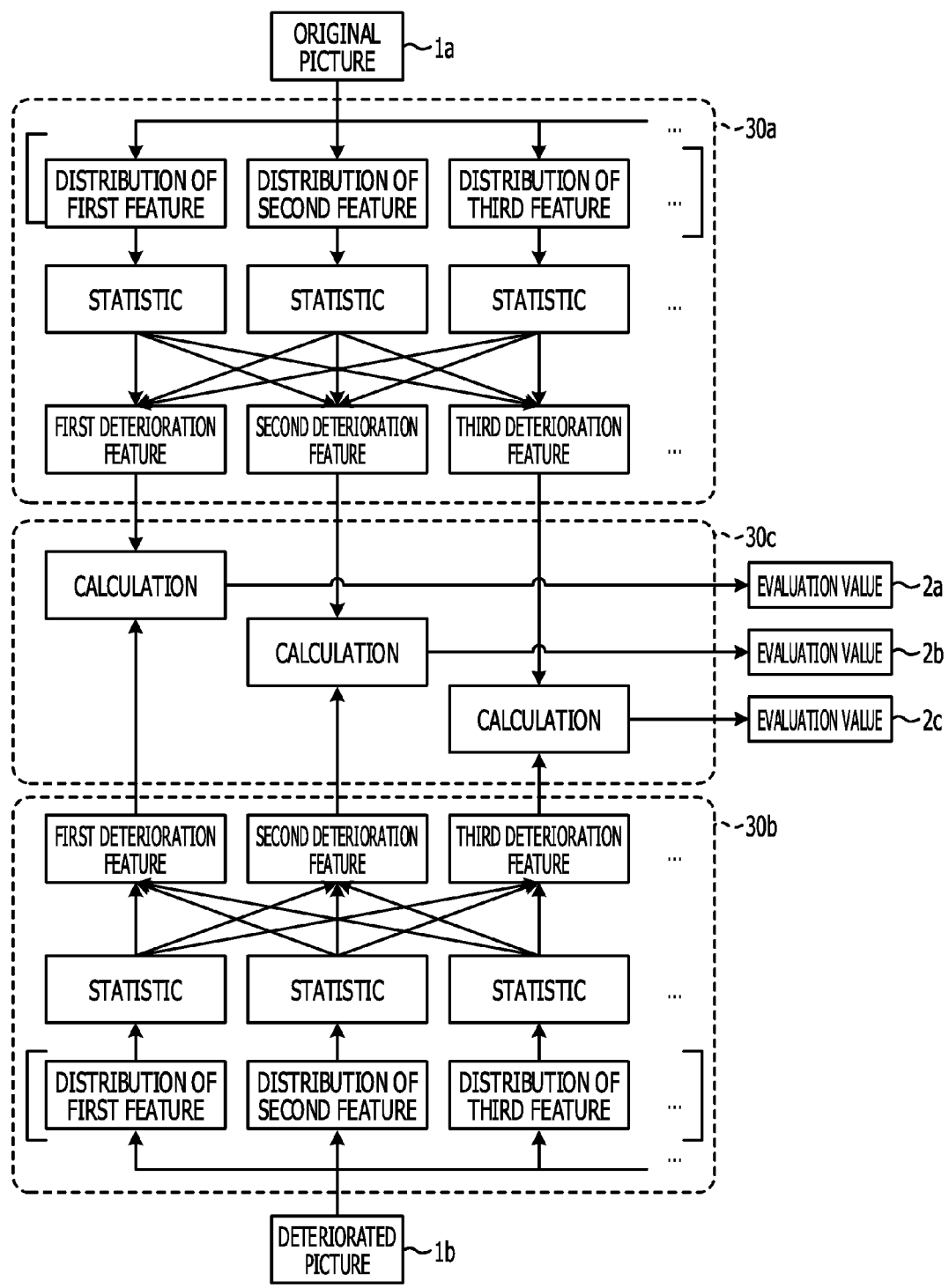
FIG. 16 illustrates a conventional technology that uses a RR method.
Figure 17:
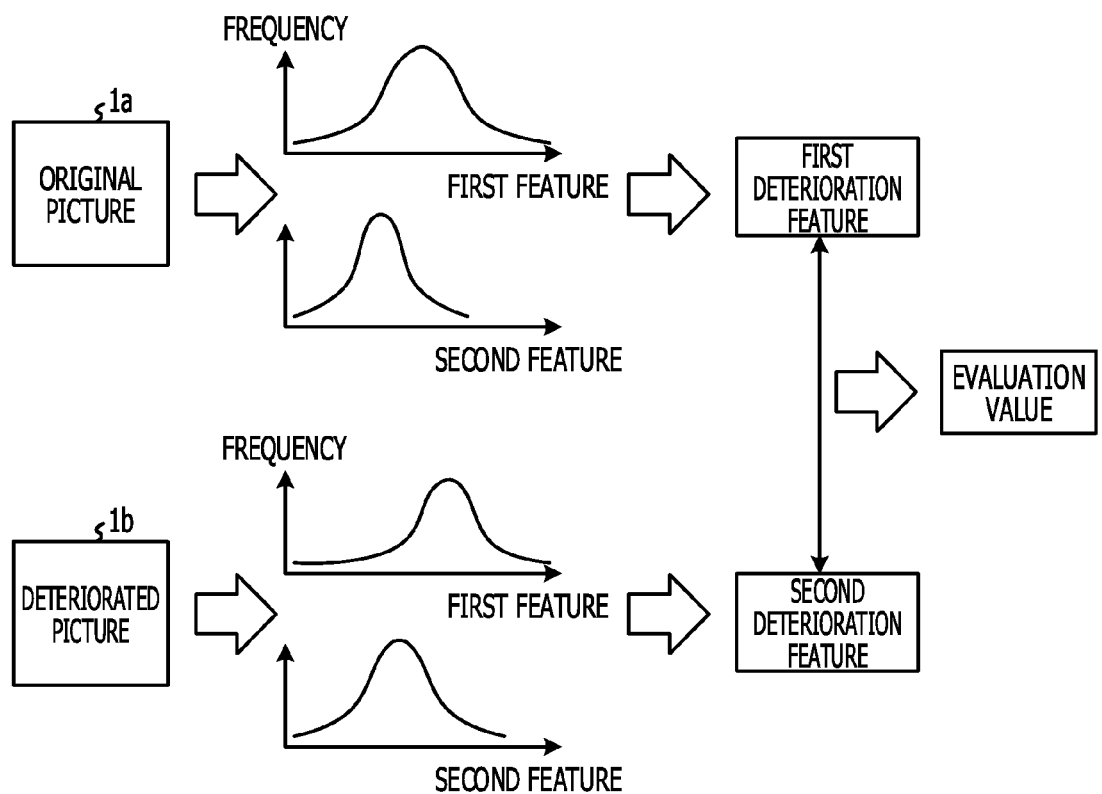
FIG. 17 illustrates the conventional technology.

In the conventional technology that has been described with reference to FIG. 16, statistics based on one-dimensional distributions of features are used to calculate deterioration features. A deterioration feature is obtained independently for each feature distribution. FIG. 17 illustrates the conventional technology. In the example in FIG. 17, a first deterioration feature and a second deterioration feature are each calculated from the one-dimensional distribution of a first feature and a second feature and an evaluation value is calculated from the first and second deterioration features.

To detect a deterioration factor that is difficult to detect only from the distribution of each feature, therefore, features and statistics from which deterioration can be detected are newly added and deterioration features used to detect the deterioration factor is recalculated. This processing is redundant and complex.

As for a deterioration factor for the degree of an increase or a decrease in image edges, for example, to detect a further detailed increase or decrease in edges separately in noise generation and in contrast emphasis, it is desirable to recalculate new features other than the amount of edges and differences in time and then recalculate a statistic.

In an aspect, an object of the technology disclosed in an embodiment is to evaluate deterioration caused during conversion of image data included in video data by using desired quality parameters.

Embodiments of an evaluation apparatus, an evaluation method, and an evaluation program disclosed in this application will be described below in detail with reference to the drawings. However, the present disclosure is not limited to these embodiments.

First Embodiment

Figure 1:
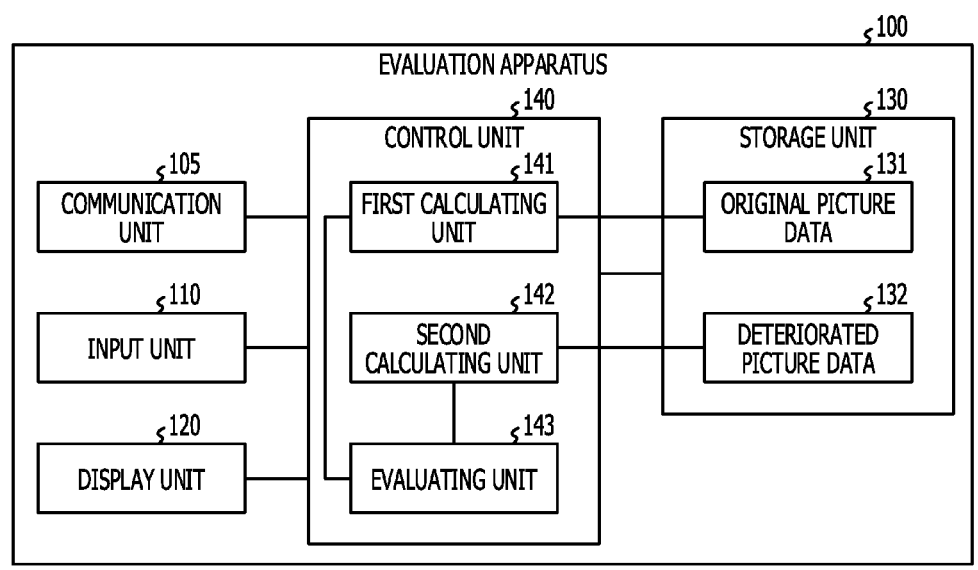
FIG. 1 is a functional block diagram illustrating the structure of an evaluation apparatus in a first embodiment.

An evaluation apparatus in a first embodiment will be described. FIG. 1 is a functional block diagram illustrating the structure of an evaluation apparatus in the first embodiment. As illustrated in FIG. 1, the evaluation apparatus 100 includes a communication unit 105, an input unit 110, a display unit 120, a storage unit 130, and a control unit 140.

The communication unit 105 performs communication with an external apparatus through a network or the like. For example, the evaluation apparatus 100 may acquire original video data 131 and deteriorated video data 132 from another apparatus through the communication unit 105.

The input unit 110 receives various types of information. The input unit 110 is, for example, a keyboard, a mouse, a touch panel, or the like. The display unit 120 displays information output from the control unit 140. The display unit 120 is, for example, a monitor, a liquid crystal display, or the like.

The storage unit 130 stores the original video data 131 and deteriorated video data 132. The storage unit 130 is a storage device such as, for example, a random-access memory (RAM), a read-only memory (ROM), a flash memory, or another semiconductor memory.

The original video data 131 is video data before transcoding. The deteriorated video data 132 is video data obtained by transcoding the original video data 131.

The control unit 140 includes a first calculating unit 141, a second calculating unit 142, and an evaluating unit 143. The control unit 140 is, for example, an application-specific integrated circuit (ASIC), a field-programmable gate array (FPGA), or another integrated circuit. Alternatively, the control unit 140 is, for example, a central processing unit (CPU), a micro-processing unit (MPU), or another electronic circuit.

The first calculating unit 141 is a processing unit that calculates a first-order difference and a second-order difference for each pixel of an image included in the original video data 131 to calculate the basic feature of the original video data 131. The first calculating unit 141 outputs information about the basic feature of the original video data 131 to the evaluating unit 143.

The second calculating unit 142 is a processing unit that calculates a first-order difference and a second-order difference for each pixel of an image included in the deteriorated video data 132 to calculate the basic feature of the deteriorated video data 132. The second calculating unit 142 outputs information about the basic feature of the deteriorated video data 132 to the evaluating unit 143.

The evaluating unit 143 is a processing unit that evaluates deterioration of the deteriorated video data 132 to the original video data 131 according to the basic feature of the original video data 131 and the basic feature of the deteriorated video data 132. The evaluating unit 143 in the first embodiment evaluates image blurring as an example.

Next, processing by the first calculating unit 141 will be described. Assuming that the pixel values of a video at a position (x, y) of an image in an n-th frame in the original video data 131 are F (n, x, y), the absolute values Dh (n, x, y) and Dv (n, x, y) of a first-order difference of a spatial difference at that position in a horizontal direction and in the vertical direction are defined according to equations (1) and (2) below.

$$Dh(n,x,y)=|F(n,x+1,y)-F(n,x-1,Y)| \quad (1)$$

$$Dv(n,x,y)=|F(n,x,y+1)-F(n,x,y-1)| \quad (2)$$

The first calculating unit 141 calculates Dh(n, x, y) and Dv(n, x, y) according to equations (1) and (2). Specifically, the first calculating unit 141 calculates Dh(n, x, y) and Dv(n, x, y) for each pixel in an image in each frame in the original video data 131. Dh(n, x, y) and Dv(n, x, y) calculated from the original video data 131 correspond to the first feature. In the description below, Dh(n, x, y) will be appropriately denoted Dh and Dv (n, x, y) will be appropriately denoted Dv.

Assuming as described above that the pixel values of a video at a position (x, y) of an image in an n-th frame in the original video data 131 are F (n, x, y), the absolute values Eh (n, x, y) and Ev (n, x, y) of a second-order difference of a spatial difference at that position in a horizontal direction and in the vertical direction are defined according to equations (3) and (4) below.

$$Eh(n,x,y)=|F(n,x+1,y)-2\times F(n,x,y)+F(n,x-1,y)| \quad (3)$$

$$Ev(n,x,y)=|F(n,x,y+1)-2\times F(n,x,y)+F(n,x,y-1)| \quad (4)$$

The first calculating unit 141 calculates Eh(n, x, y) and Ev(n, x, y) according to equations (3) and (4). Specifically, the first calculating unit 141 calculates Eh(n, x, y) and Ev(n, x, y) for each pixel in an image in each frame in the original video data 131. Eh(n, x, y) and Ev(n, x, y) calculated from the original video data 131 correspond to the second feature. In the description below, Eh(n, x, y) will be appropriately denoted Eh and Ev (n, x, y) will be appropriately denoted Ev.

The first calculating unit 141 outputs information about (Dh, Eh) and (Dv, Ev) calculated from the original video data 131 to the evaluating unit 143. The information about (Dh, Eh) and (Dv, Ev) corresponds to information about the basic feature of the original video data 131.

Processing by the second calculating unit 142 is the same as processing by the first calculating unit 141 except that the deteriorated video data 132 is processed instead of the original video data 131. Accordingly, a specific description of the second calculating unit 142 will be omitted. The second calculating unit 142 outputs information about (Dh, Eh) and (Dv, Ev) calculated from the deteriorated video data 132 to the evaluating unit 143. The information about (Dh, Eh) and (Dv, Ev) corresponds to information about the basic feature of the deteriorated video data 132.

Figure 2:
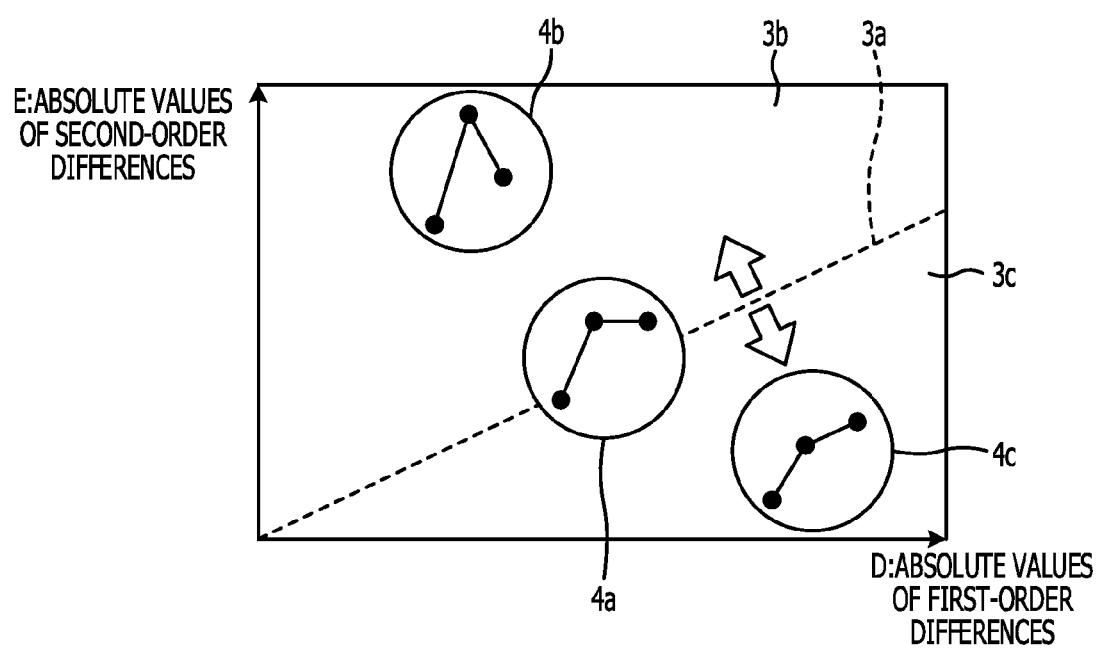
FIG. 2 illustrates a relationship among absolute values of first-order differences, the absolute values of second-order differences, and image patterns.

If (Dh, Eh) and (Dv, Ev) are placed on a two-dimensional plane, image patterns, each of which is formed with three pixels that are a pixel at (n, x, y), a pixel on the left and a pixel on the right, are related as illustrated in FIG. 2. Image patterns, each of which is formed with three pixels that are a pixel at (n, x, y), a pixel at an upper position and a pixel at a lower position, are related similarly. FIG. 2 illustrates a relationship among absolute values of first-order differences, the absolute values of second-order differences, and image patterns. In FIG. 2, the horizontal axis represents absolute values Dh or Dv of first-order differences and the vertical axis represents absolute values Eh or Ev of second-order differences. In the first embodiment, a representation of (Dh, Eh) and (Dv, Ev) placed on a two-dimensional plane as illustrated in FIG. 2 as an example will be referred to below as a simultaneous feature distribution.

For simplicity, the Dh-Eh relationship and the Dv-Ev relationship in FIG. 2 will be collectively referred to as the D-E relationship. Image patterns differ depending on whether their positions determined by the D-E relationship are on the line 3a in FIG. 2, in the area 3b above the line 3a, or in the area 3c below the line 3a. The line 3a is a straight line indicating that E and D are equal to each other.

If E is larger than D, the image pattern is in the area 3b. In this case, the image pattern is an acute pattern, in which the central pixel has an extremum, as indicated by 4b. If E and D are equal to each other, the image pattern is a right-angle pattern in which the pixel on the right or left has the same value as the central pixel, as indicated by 4a. If E is smaller than D, the image pattern is an obtuse pattern, in which the three pixels have values that are monotonously decreased or increased as indicated by 4c.

The evaluating unit 143 can obtain an evaluation value, which indicates a degree of deterioration for a deterioration factor by checking a change in the simultaneous distribution of D and E between the original video data 131 and the deteriorated video data 132. If, for example, block noise occurs in the deteriorated video data 132, places at each of which there is an unnatural step increase. Accordingly, the frequency of right-angle patterns is increased in the simultaneous distribution of the basic feature of the deteriorated video data 132.

If noise occurs in the deteriorated video data 132, places at each of which pixel values change jaggedly in the video and acute patterns increase. Noise includes random noise and mosquito noise. If the video of the deteriorated video data 132 is blurred, changes in pixel values are smoothed and obtuse patterns increase.

Figure 3:
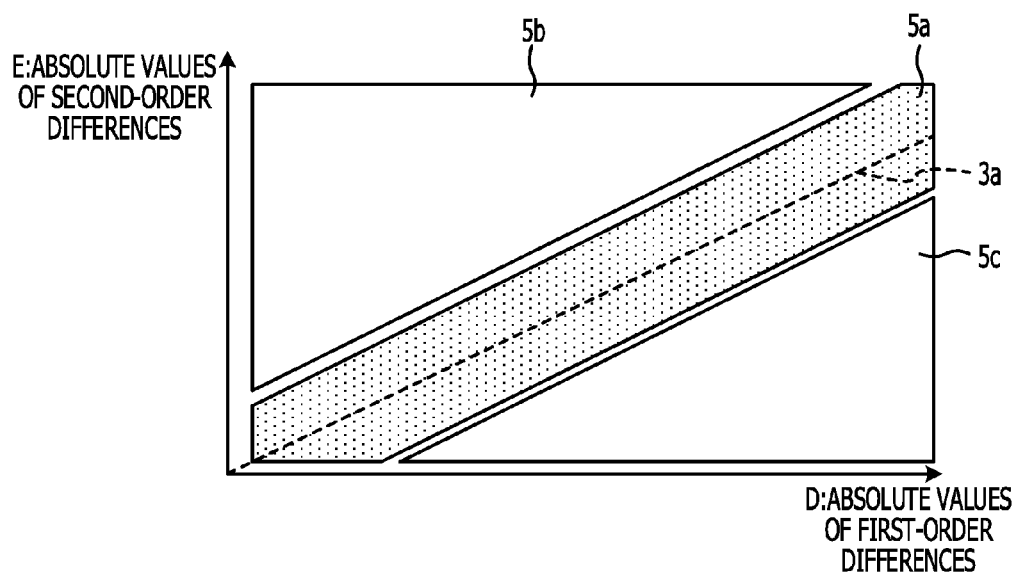
FIG. 3 illustrates a relationship between block noise, blurring, and noise in the simultaneous distribution of a basic feature.

Examples of deterioration factors related to areas in the simultaneous distribution of a basic feature will be described. FIG. 3 illustrates a relationship between block noise, blurring, and noise in the simultaneous distribution of the basic feature. In FIG. 3, the horizontal axis represents absolute values D of first-order differences and the vertical axis represents absolute values E of second-order differences. If the D-E relationship is included in the area 5a, it indicates that block noise has occurred. If the D-E relationship is included in the area 5b, it indicates that noise has occurred. If the D-E relationship is included in the area 5c, it indicates that blurring has occurred.

Figure 4:
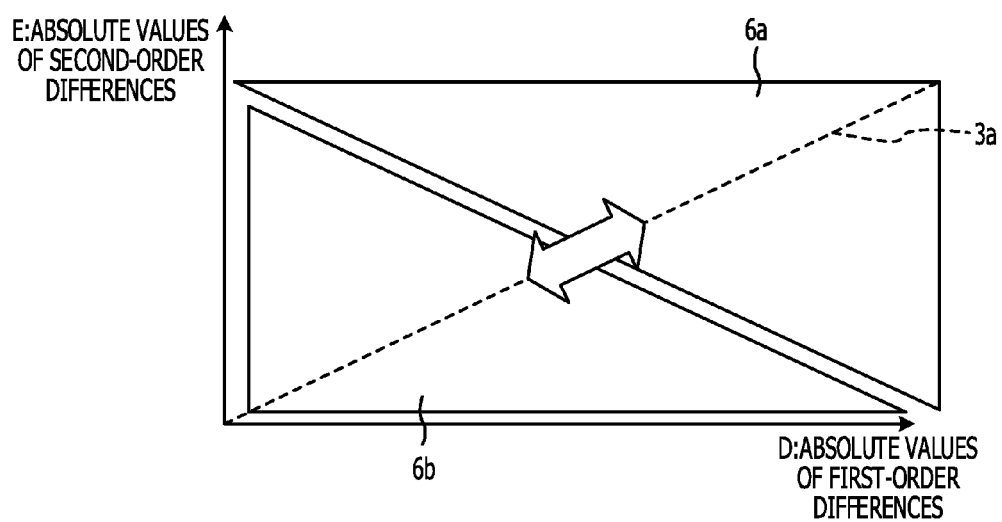
FIG. 4 illustrates a relationship between contrast emphasis and contrast suppression in the simultaneous distribution of the basic feature.

FIG. 4 illustrates a relationship between contrast emphasis and contrast suppression in the simultaneous distribution of the basic feature. In FIG. 4, the horizontal axis represents absolute values D of first-order differences and the vertical axis represents absolute values E of second-order differences. If the D-E relationship is included in the area 6a, it indicates contrast is emphasized. If the D-E relationship is included in the area 6b, it indicates contrast is suppressed. For a video in which contrast is emphasized, for example, both a first-order difference and a second-order difference at each pixel position are increased, so the simultaneous distribution of the basic feature is shifted toward the upper right corner. For a video in which contrast is suppressed, both a first-order difference and a second-order difference at each pixel position are decreased, so the simultaneous distribution of the basic feature is shifted toward the lower left corner.

Next, processing by the evaluating unit 143 will be described. The evaluating unit 143 in the first embodiment calculates the deterioration feature of blurring and calculates an evaluation value for blurring.

A case in which the evaluating unit 143 calculates the deterioration feature of the original video data 131 will be described. The evaluating unit 143 acquires the basic feature of the original video data 131 from the first calculating unit 141 and decides whether the simultaneous distribution of the basic feature is included in the area 5c for blurring in FIG. 3. Specifically, the evaluating unit 143 decides whether the simultaneous distribution of the basic feature is included in the area 5c for each pixel and adds a prescribed value to deterioration feature $FO_1$ each time the evaluating unit 143 decides that the simultaneous distribution of the basic feature is included in the area 5c. Deterioration feature $FO_1$ indicates the deterioration feature of blurring in the original video data 131.

The blurring area is an area in which an image pattern formed by three pixels around a target pixel is an obtuse pattern. If a set of two-dimensional coordinates (D, E) of the blurring area is denoted BL, BL is represented by equation (5) or (6) below. In equation (5), $C_1$ is a constant. In equation (6), $C_2$ is a constant.

$$BL=\{(D,E)|E \leq D-C_1\} \quad (5)$$

$$BL=\{(D,E)|\arctan(E/D) \leq \pi/4 - C_2\} \quad (6)$$

Next, a case in which the evaluating unit 143 calculates the deterioration feature of the deteriorated video data 132 will be described. The evaluating unit 143 acquires the basic feature of the deteriorated video data 132 from the second calculating unit 142 and decides whether the simultaneous distribution of the basic feature is included in the area 5c for blurring in FIG. 3. Specifically, the evaluating unit 143 decides whether the simultaneous distribution of the basic feature is included in the area 5c for each pixel and adds a prescribed value to deterioration feature $FD_1$ each time the evaluating unit 143 decides that the simultaneous distribution of the basic feature is included in the area 5c. Deterioration feature $FD_1$ indicates the deterioration feature of blurring in the deteriorated video data 132.

The evaluating unit 143 subtracts deterioration feature $FO_1$ from deterioration feature $FD_1$ to obtain evaluation value $V_1$. Evaluation value $V_1$ is an evaluation value related to blurring. When evaluation value $V_1$ is positive, the larger evaluation value $V_1$ is, the larger the degree of deterioration is.

Figure 5:
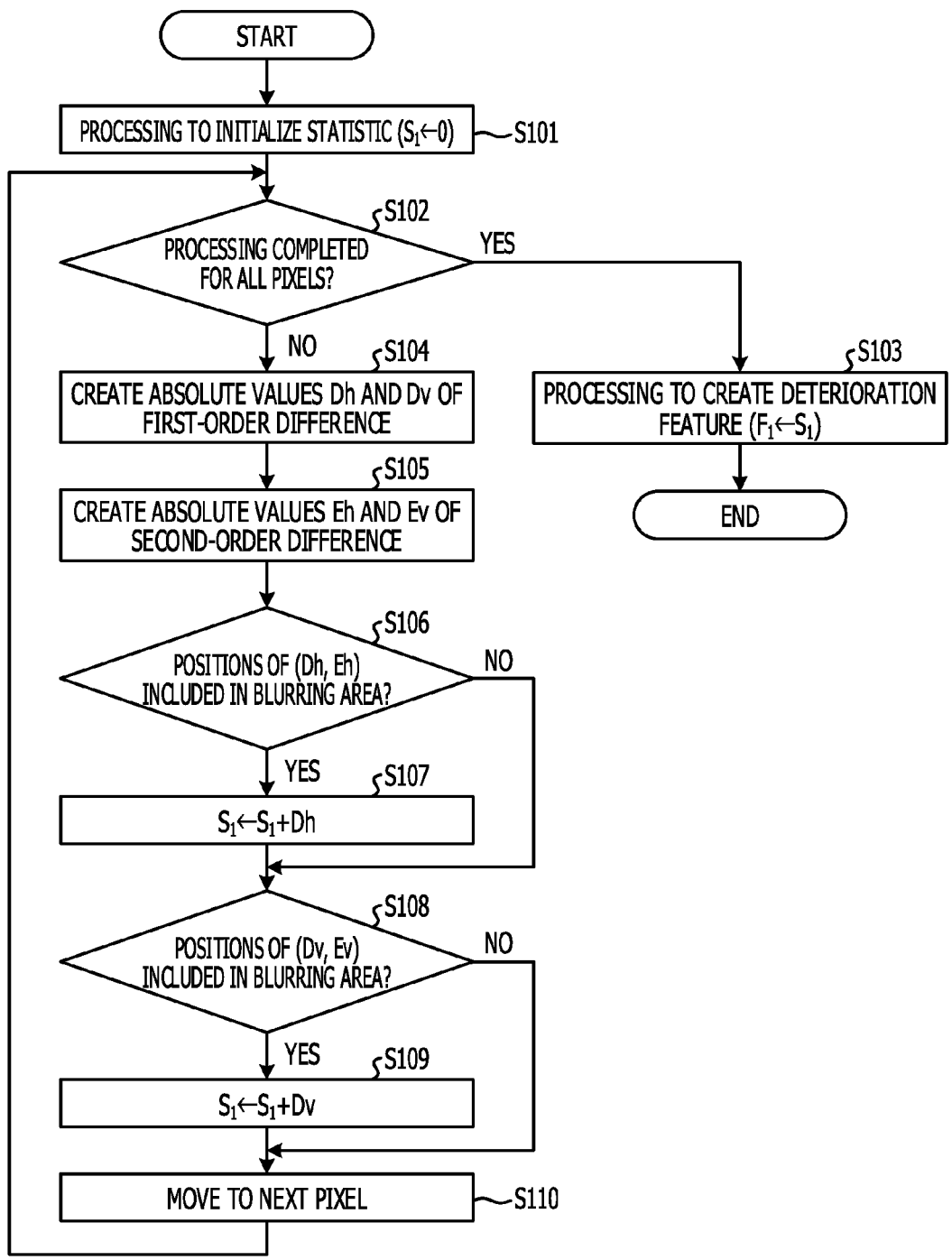
FIG. 5 is a flowchart illustrating a processing procedure for creating a deterioration feature related to blurring.

Next, a processing procedure executed by the evaluation apparatus 100 in the first embodiment will be described. FIG. 5 is a flowchart illustrating a processing procedure for creating a deterioration feature related to blurring. Processing for creating a deterioration feature from the original video data 131 and processing for creating a deterioration feature from the deteriorated video data 132 are the same.

As illustrated in FIG. 5, the evaluation apparatus 100 initializes a statistic (step S101). In step S101, the evaluation apparatus 100 sets the value of statistic $S_1$ to 0. The evaluation apparatus 100 then decides whether processing has been completed for all pixels (step S102). If processing has been completed for all pixels (the result in step S102 is Yes), the evaluation apparatus 100 performs deterioration feature creation processing (step S103). In step S103, the evaluation apparatus 100 sets the value of deterioration feature $F_1$ as $S_1$.

If processing has not been completed for all pixels (the result in step S102 is No), the evaluation apparatus 100 creates the absolute values Dh and Dv of a first-order difference (step S104). The evaluation apparatus 100 then creates the absolute values Eh and Ev of a second-order difference (step S105).

The evaluation apparatus 100 decides whether the positions of (Dh, Eh) are included in the blurring area (step S106). If the positions of (Dh, Eh) are not included in the blurring area (the result in step S106 is No), the evaluation apparatus 100 causes the sequence to proceed to step S108.

If the positions of (Dh, Eh) are included in the blurring area (the result in step S106 is Yes), the evaluation apparatus 100 adds the value of Dh to the value of $S_1$ and stores the resulting value in $S_1$ to update the value of $S_1$ (step S107).

The evaluation apparatus 100 decides whether the positions of (Dv, Ev) are included in the blurring area (step S108). If the positions of (Dv, Ev) are not included in the blurring area (the result in step S108 is No), the evaluation apparatus 100 causes the sequence to proceed to step S110.

If the positions of (Dv, Ev) are included in the blurring area (the result in step S108 is Yes), the evaluation apparatus 100 adds the value of Dv to the value of $S_1$ and stores the resulting value in $S_1$ to update the value of $S_1$ (step S109). The evaluation apparatus 100 proceeds to processing of a next pixel (step S110), after which the evaluation apparatus 100 causes the sequence to return to step S102.

To calculate deterioration feature $FO_1$ of the original video data 131, the evaluation apparatus 100 executes the processing illustrated in FIG. 5 on the original video data 131. Similarly, to calculate deterioration feature $FD_1$ of the deteriorated video data 132, the evaluation apparatus 100 executes the processing illustrated in FIG. 5 on the deteriorated video data 132. The evaluation apparatus 100 subtracts deterioration feature $FO_1$ from deterioration feature $FD_1$ to obtain evaluation value $V_1$.

Next, effects provided by the evaluation apparatus 100 in the first embodiment will be described. The evaluation apparatus 100 calculates a basic feature from the original video data 131 and a basic feature from the deteriorated video data 132. The evaluation apparatus 100 decides, according to the basic feature of the original video data 131, whether the simultaneous distribution area is included in the blurring area and calculates deterioration feature $FO_1$ according to the decision result. Similarly, the evaluation apparatus 100 decides, according to the basic feature of the deteriorated video data 132, whether the simultaneous distribution area is included in the blurring area and calculates deterioration feature $FD_1$ according to the decision result. The evaluation apparatus 100 then calculates evaluation value $V_1$ from deterioration feature $FO_1$ and deterioration feature $FD_1$. Thus, the evaluation apparatus 100 can calculate an evaluation value for which blurring is used as a parameter by using the simultaneous distributions of the original video data 131 and deteriorated video data 132.

Second Embodiment

Figure 6:
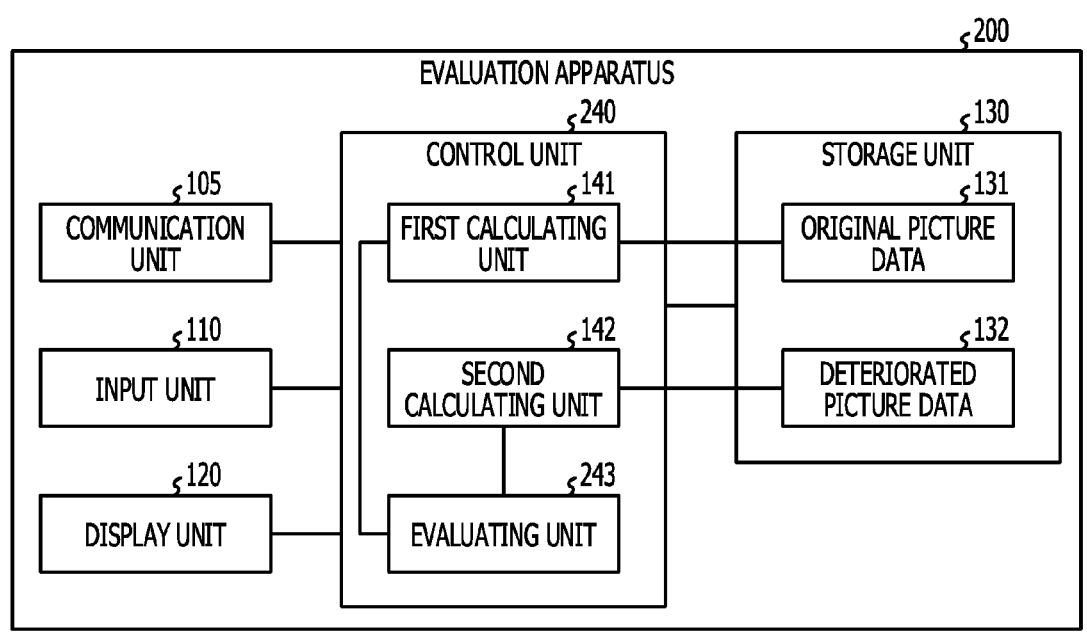
FIG. 6 is a functional block diagram illustrating the structure of an evaluation apparatus in a second embodiment.

An evaluation apparatus in a second embodiment will be described. FIG. 6 is a functional block diagram illustrating the structure of the evaluation apparatus in the second embodiment. As an example, the evaluation apparatus in the second embodiment calculates deterioration features related to blurring, block noise, and noise to perform evaluation.

As illustrated in FIG. 6, the evaluation apparatus 200 includes a communication unit 105, an input unit 110, a display unit 120, a storage unit 130, and a control unit 240. The communication unit 105, input unit 110, display unit 120, and storage unit 130 are the same as in FIG. 1, so their descriptions will be omitted.

The control unit 240 includes a first calculating unit 141, a second calculating unit 142, and an evaluating unit 243.

The first calculating unit 141 is a processing unit that calculates a first-order difference and a second-order difference for each pixel of an image included in the original video data 131 to calculate the basic feature of the original video data 131, as with the first calculating unit 141 in FIG. 1. The first calculating unit 141 in the second embodiment outputs information about the basic feature of the original video data 131 to the evaluating unit 243.

The second calculating unit 142 is a processing unit that calculates a first-order difference and a second-order difference for each pixel of an image included in the deteriorated video data 132 to calculate the basic feature of the deteriorated video data 132, as with the second calculating unit 142 in FIG. 1. The second calculating unit 142 in the second embodiment outputs information about the basic feature of the deteriorated video data 132 to the evaluating unit 243.

The evaluating unit 243 calculates deterioration features related to blurring, block noise, and noise and calculates evaluation values related to blurring, block noise, and noise. Descriptions of calculation of deterioration feature $FO_1$ and deterioration feature $FD_1$ and processing for calculating evaluation value $V_1$ will be omitted because they are the same as in the descriptions of the evaluating unit 143 in the first embodiment.

A case in which the evaluating unit 243 calculates deterioration feature $FO_2$ of the original video data 131 will be described. The evaluating unit 243 acquires the basic feature of the original video data 131 from the first calculating unit 141 and decides whether the simultaneous distribution of the basic feature is included in the area 5a for block noise in FIG. 3. Specifically, the evaluating unit 243 decides whether the simultaneous distribution of the basic feature is included in the area 5a for each pixel and adds a prescribed value to deterioration feature $FO_2$ each time the evaluating unit 243 decides that the simultaneous distribution of the basic feature is included in the area 5a.

The block noise area, for example, is an area in which an image pattern formed by three pixels around a target pixel is a right-angle pattern. If a set of two-dimensional coordinates (D, E) of the block noise area is denoted BN, BN is represented by equation (7) or (8) below. In equation (7), $C_1$ is a constant. In equation (8), $C_2$ is a constant.

$$BN=\{(D,E)|E>D-C_1 \text{ and } E<D+C_1\} \tag{7}$$

$$BN=\{(D,E)|\arctan(E/D)>\pi/4-C_2 \text{ and } \arctan(E/D)<\pi/4+C_2\}. \tag{8}$$

Next, a case in which the evaluating unit 243 calculates deterioration feature $FD_2$ of the deteriorated video data 132 will be described. The evaluating unit 243 acquires the basic feature of the deteriorated video data 132 from the second calculating unit 142 and decides whether the simultaneous distribution of the basic feature is included in the area 5a for block noise in FIG. 3. Specifically, the evaluating unit 243 decides whether the simultaneous distribution of the basic feature is included in the area 5a for each pixel and adds a prescribed value to deterioration feature $FD_2$ each time the evaluating unit 243 decides that the simultaneous distribution of the basic feature is included in the area 5a.

The evaluating unit 243 subtracts deterioration feature $FO_2$ from deterioration feature $FD_2$ to obtain evaluation value $V_2$ related to block noise. When evaluation value $V_2$ is positive, the larger evaluation value $V_2$ is, the larger the degree of deterioration related to block noise is.

Next, a case in which the evaluating unit 243 calculates deterioration feature $FO_3$ of the original video data 131 will be described. The evaluating unit 243 acquires the basic feature of the original video data 131 from the first calculating unit 141 and decides whether the simultaneous distribution of the basic feature is included in the area 5b for noise in FIG. 3. Specifically, the evaluating unit 243 decides whether the simultaneous distribution of the basic feature is included in the area 5b for each pixel and adds a prescribed value to deterioration feature $FO_3$ each time the evaluating unit 243 decides that the simultaneous distribution of the basic feature is included in the area 5b.

The noise area, for example, is an area in which an image pattern formed by three pixels around a target pixel is an acute pattern. If a set of two-dimensional coordinates (D, E) of the noise area is denoted NS, NS is represented by equation (9) or (10) below. In equation (9), $C_1$ is a constant. In equation (10), $C_2$ is a constant.

$$NS=\{(D,E)|E \geq D+C_1\} \tag{9}$$

$$NS=\{(D,E)|\arctan(E/D) \geq \pi/4+C_2\} \tag{10}$$

Next, a case in which the evaluating unit 243 calculates deterioration feature $FD_3$ of the deteriorated video data 132 will be described. The evaluating unit 243 acquires the basic feature of the deteriorated video data 132 from the second calculating unit 142 and decides whether the simultaneous distribution of the basic feature is included in the area 5b for noise in FIG. 3. Specifically, the evaluating unit 243 decides whether the simultaneous distribution of the basic feature is included in the area 5b for each pixel and adds a prescribed value to deterioration feature $FD_3$ each time the evaluating unit 243 decides that the simultaneous distribution of the basic feature is included in the area 5b.

The evaluating unit 243 subtracts deterioration feature $FO_1$ from deterioration feature $FD_1$ to obtain evaluation value $V_1$ related to blurring. The evaluating unit 243 subtracts deterioration feature $FO_2$ from deterioration feature $FD_2$ to obtain evaluation value $V_2$ related to block noise. The evaluating unit 243 subtracts deterioration feature $FO_3$ from deterioration feature $FD_3$ to obtain evaluation value $V_3$ related to noise. When evaluation values $V_1$ to $V_3$ are positive, the larger evaluation values $V_1$ to $V_3$ are, the larger the degrees of deterioration related to blurring, block noise, and noise are, respectively.

Figure 7:
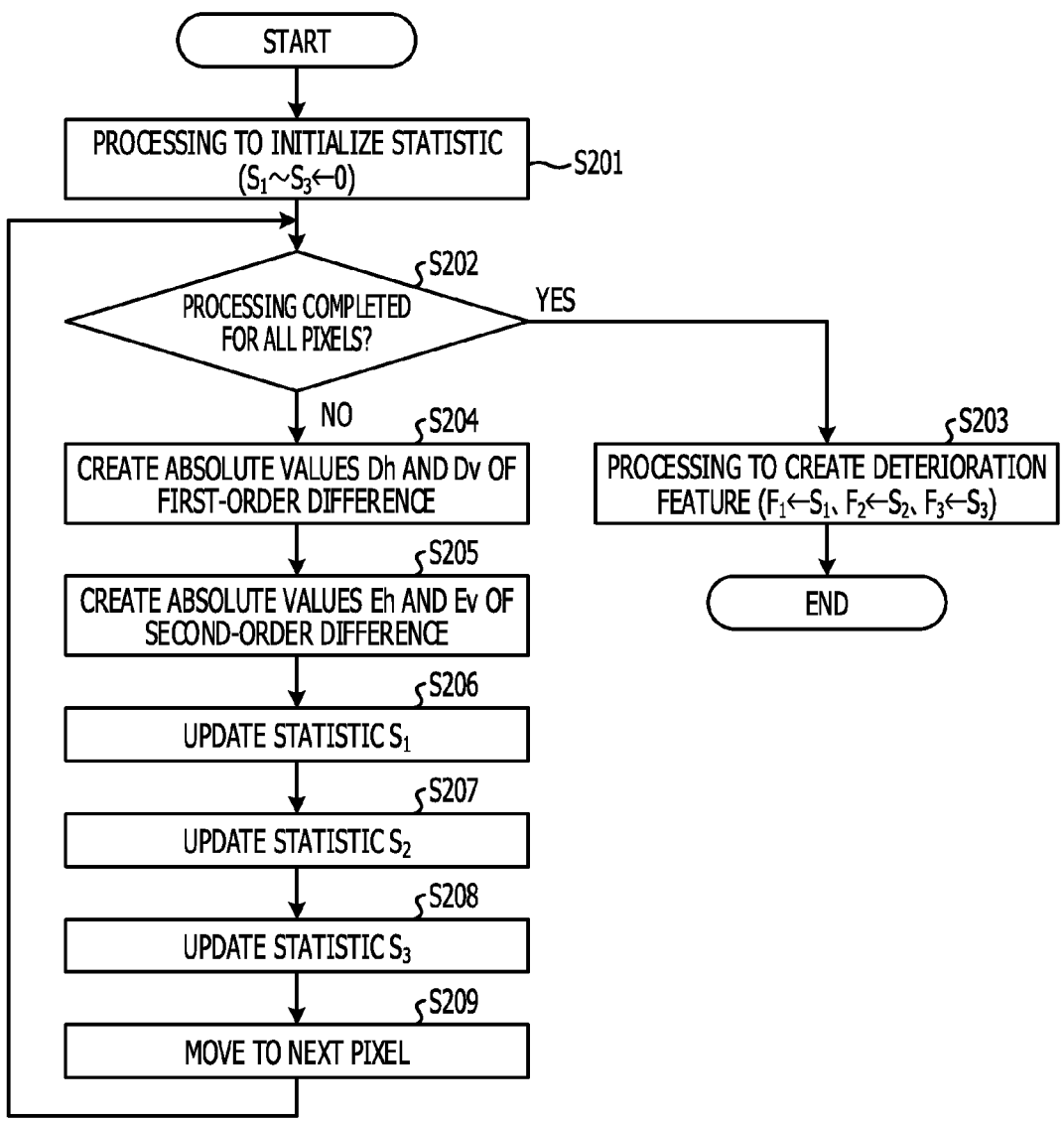
FIG. 7 is a flowchart illustrating a processing procedure for creating deterioration features related to blurring, block noise, and noise.

Next, a processing procedure executed by the evaluation apparatus 200 in the second embodiment will be described. FIG. 7 is a flowchart illustrating a processing procedure for creating deterioration features related to blurring, block noise, and noise. Processing for creating each deterioration feature from the original video data 131 and processing for creating each deterioration feature from the deteriorated video data 132 are the same.

As illustrated in FIG. 7, the evaluation apparatus 200 initializes statistics (step S201). In step S201, the evaluation apparatus 200 sets the values of statistics $S_1$, $S_2$, and $S_3$ to 0. The evaluation apparatus 200 then decides whether processing has been completed for all pixels (step S202). If processing has been completed for all pixels (the result in step S202 is Yes), the evaluation apparatus 200 performs deterioration feature creation processing (step S203). In step S203, the evaluation apparatus 200 sets the value of deterioration feature $F_1$ as statistic $S_1$, sets the value of deterioration feature $F_2$ as statistic $S_2$, and sets the value of deterioration feature $F_3$ as statistic $S_3$.

If processing has not been completed for all pixels (the result in step S202 is No), the evaluation apparatus 200 creates the absolute values Dh and Dv of a first-order difference (step S204). The evaluation apparatus 200 then creates the absolute values Eh and Ev of a second-order difference (step S205).

The evaluation apparatus 200 updates statistic $S_1$ as described below (step S206). If the positions of (Dh, Eh) are included in the blurring area, the evaluation apparatus 200 adds the value of Dh to the value of $S_1$ and stores the resulting value in $S_1$ to update the value of $S_1$ in step S206. Then, if the positions of (Dv, Ev) are included in the blurring area, the evaluation apparatus 200 adds the value of Dv to the value of $S_1$ and stores the resulting value in $S_1$ to update the value of $S_1$.

The evaluation apparatus 200 updates statistic $S_2$ as described below (step S207). If the positions of (Dh, Eh) are included in the block noise area, the evaluation apparatus 200 adds the value of Dh to the value of $S_2$ and stores the resulting value in $S_2$ to update the value of $S_2$ in step S207. Then, if the positions of (Dv, Ev) are included in the block noise area, the evaluation apparatus 200 adds the value of Dv to the value of $S_2$ and stores the resulting value in $S_2$ to update the value of $S_2$.

The evaluation apparatus 200 updates statistic $S_3$ as described below (step S208). If the positions of (Dh, Eh) are included in the noise area, the evaluation apparatus 200 adds the value of Dh to the value of $S_3$ and stores the resulting value in $S_3$ to update the value of $S_3$ in step S208. Then, if the positions of (Dv, Ev) are included in the noise area, the evaluation apparatus 200 adds the value of Dv to the value of $S_3$ and stores the resulting value in $S_3$ to update the value of $S_3$.

The evaluation apparatus 200 proceeds to processing of a next pixel (step S209), after which the evaluation apparatus 200 causes the sequence to return to step S202.

To calculate deterioration features $FO_1$, $FO_2$, and $FO_3$, of the original video data 131, the evaluation apparatus 200 executes the processing illustrated in FIG. 7 on the original video data 131. Similarly, to calculate deterioration features $FD_1$, $FD_2$, and $FD_3$ of the deteriorated video data 132, the evaluation apparatus 200 executes the processing illustrated in FIG. 7 on the deteriorated video data 132. The evaluation apparatus 200 subtracts deterioration feature $FO_1$ from deterioration feature $FD_1$ to obtain evaluation value $V_1$. The evaluation apparatus 200 subtracts deterioration feature $FO_2$ from deterioration feature $FD_2$ to obtain evaluation value $V_2$. The evaluation apparatus 200 subtracts deterioration feature $FO_3$ from deterioration feature $FD_3$ to obtain evaluation value $V_3$.

Next, effects provided by the evaluation apparatus 200 in the second embodiment will be described. The evaluation apparatus 200 calculates a basic feature from the original video data 131 and a basic feature from the deteriorated video data 132. The evaluation apparatus 200 decides, according to the basic feature of the original video data 131, whether the simultaneous distribution area is included in the pertinent area and calculates deterioration features $FO_1$, $FO_2$, and $FO_3$ according to the decision result. Similarly, the evaluation apparatus 200 decides, according to the basic feature of the deteriorated video data 132, whether the simultaneous distribution area is included in the pertinent area and calculates deterioration features $FD_1$, $FD_2$, and $FD_3$ according to the decision result. The evaluation apparatus 200 then calculates evaluation values $V_1$ to $V_3$ from deterioration features $FO_1$, $FO_2$, and $FO_3$ and deterioration features $FD_1$, $FD_2$, and $FD_3$. Thus, the evaluation apparatus 200 can calculate evaluation values for which blurring, block noise, and noise are used as parameters by using the simultaneous distributions of the original video data 131 and deteriorated video data 132.

Third Embodiment

Figure 8:
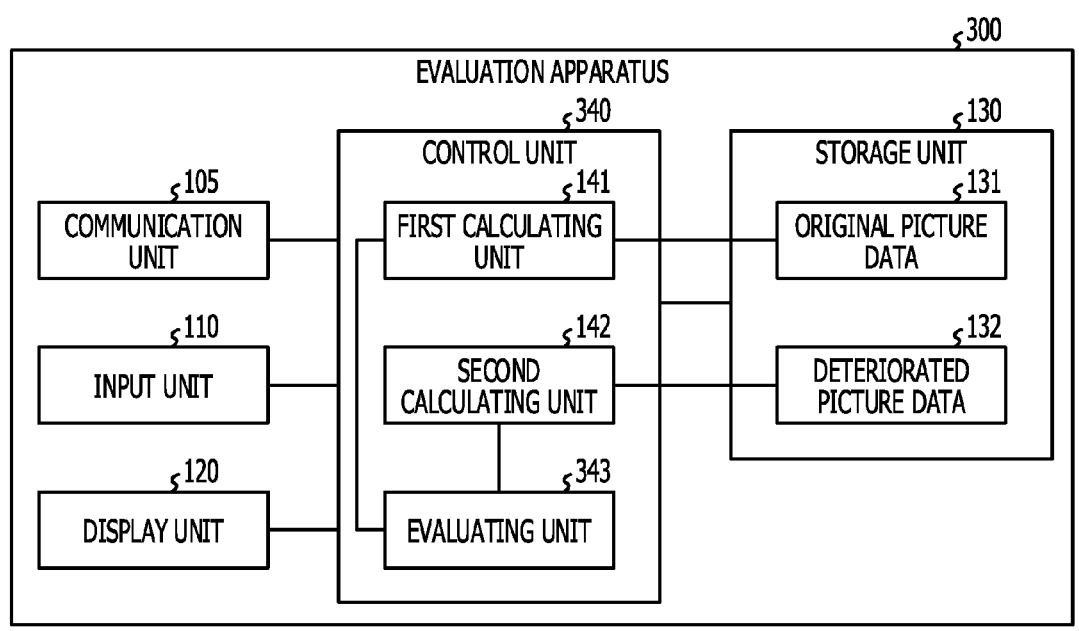
FIG. 8 is a functional block diagram illustrating the structure of an evaluation apparatus in a third embodiment.

An evaluation apparatus in a third embodiment will be described. FIG. 8 is a functional block diagram illustrating the structure of the evaluation apparatus in the third embodiment. As an example, the evaluation apparatus in the third embodiment creates deterioration features related to blurring and noise by combining a plurality of statistics.

As illustrated in FIG. 8, the evaluation apparatus 300 includes a communication unit 105, an input unit 110, a display unit 120, a storage unit 130, and a control unit 340. The communication unit 105, input unit 110, display unit 120, and storage unit 130 are the same as in FIG. 1, so their descriptions will be omitted.

The control unit 340 includes a first calculating unit 141, a second calculating unit 142, and an evaluating unit 343.

The first calculating unit 141 is a processing unit that calculates a first-order difference and a second-order difference for each pixel of an image included in the original video data 131 to calculate the basic feature of the original video data 131, as with the first calculating unit 141 in FIG. 1. The first calculating unit 141 in the third embodiment outputs information about the basic feature of the original video data 131 to the evaluating unit 343.

The second calculating unit 142 is a processing unit that calculates a first-order difference and a second-order difference for each pixel of an image included in the deteriorated video data 132 to calculate the basic feature of the deteriorated video data 132, as with the second calculating unit 142 in FIG. 1. The second calculating unit 142 in the third embodiment outputs information about the basic feature of the deteriorated video data 132 to the evaluating unit 343.

The evaluating unit 343 creates deterioration features related to blurring and noise by combining a plurality of statistics and calculates evaluation values of blurring and noise. The evaluating unit 343 newly uses statistic $S_4$, indicated in equations (11) and (12) below, which relates to a degree of the generation of blurring and noise in a video. The smaller the value of statistic $S_4$ is, the larger the ratio of obtuse image patterns related to blurring is. The larger the value of statistic $S_4$ is, the larger the ratio of acute image patterns related to noise is.

$$S_4 \leftarrow S_4 + \arctan(Eh/Dh) \times Dh \tag{11}$$

$$S_4 \leftarrow S_4 + \arctan(Ev/Dv) \times Dv \tag{12}$$

In equations (11) and (12), arctan(E/D) represents an angle formed by a line connecting the origin and coordinates (D, E) and a half line in a D-axis direction.

The evaluating unit 343 corrects deterioration features related to blurring and noise by using deterioration feature $S_4$. For example, the evaluating unit 343 obtains $FO_1$, $FO_3$, $FD_1$, and $FD_3$ according to equations (13) and (14). In equation (13), $S_1$ represents a statistic of blurring. In equation (14), $S_3$ represents a statistic of noise. In equations (13) and (14), $\alpha$, $\beta$, $\gamma$, and $\delta$ each are an integer larger than 0.

$$F_1 = \alpha \times S_1 - \beta \times S_4 (\alpha>0, \beta>0) \tag{13}$$

$$F_3 = \gamma \times S_3 + \delta \times S_4 (\gamma>0, \delta>0) \tag{14}$$

The evaluating unit 343 subtracts deterioration feature $FO_1$ from deterioration feature $FD_1$ to obtain evaluation value $V_1$ related to blurring. When evaluation value $V_1$ is positive, the larger evaluation value $V_1$ is, the larger the degree of deterioration related to blurring is. Similarly, the evaluating unit 343 subtracts deterioration feature $FO_3$ from deterioration feature $FD_3$ to obtain evaluation value $V_3$ related to noise. When evaluation value $V_3$ is positive, the larger evaluation value $V_3$ is, the larger the degree of deterioration related to noise is.

Figure 9:
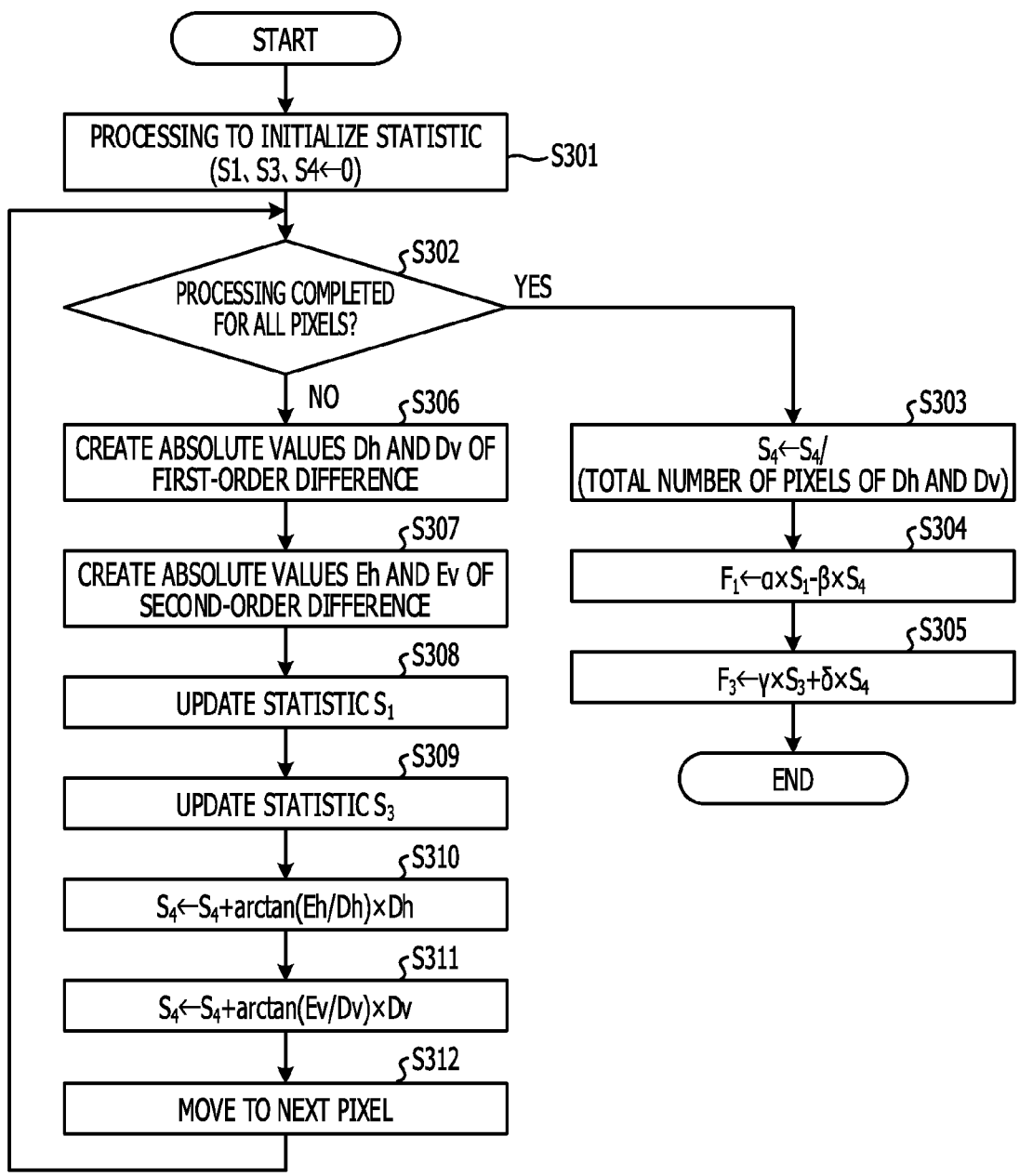
FIG. 9 is a flowchart illustrating a processing procedure for creating deterioration features related to blurring and noise.

Next, a processing procedure executed by the evaluation apparatus 300 in the third embodiment will be described. FIG. 9 is a flowchart illustrating a processing procedure for creating deterioration features related to blurring and noise. Processing for creating each deterioration feature from the original video data 131 and processing for creating each deterioration feature from the deteriorated video data 132 are the same.

As illustrated in FIG. 9, the evaluation apparatus 300 initializes statistics (step S301). In step S301, the evaluation apparatus 300 sets the values of statistics $S_1$, $S_3$, and $S_4$ to 0. The evaluation apparatus 300 then decides whether processing has been completed for all pixels (step S302). If processing has been completed for all pixels (the result in step S302 is Yes), the evaluation apparatus 300 causes the sequence to proceed to step S303.

In step S303, the evaluation apparatus 300 updates the value of $S_4$ with a value obtained by dividing $S_4$ by a total number of pixels of Dh and Dv (step S303). By performing this division, it becomes possible to know that an average of image patterns, each of which is formed with three pixels, is which of an obtuse pattern, a right-angle pattern, and an acute pattern. For example, the smaller the value of statistic $S_4$ is, the larger the ratio of obtuse image patterns related to blurring is. By contrast, the larger the value of statistic $S_4$ is, the larger the ratio of acute image patterns related to blurring is.

The evaluation apparatus 300 calculates a deterioration feature related to blurring according to equation (13) (step S304). The smaller the value of statistic $S_4$ is, the larger the ratio of obtuse image patterns related to blurring is, for example, so an item by which $S_4$ becomes negative is added in equation (13).

The evaluation apparatus 300 calculates a deterioration feature related to noise according to equation (14) (step S305). The larger the value of statistic $S_4$ is, the larger the ratio of acute image patterns related to noise is, for example, so an item by which $S_4$ becomes positive is added in equation (14).

Step S302 will be described again. If processing has not been completed for all pixels (the result in step S302 is No), the evaluation apparatus 300 creates the absolute values Dh and Dv of a first-order difference (step S306). The evaluation apparatus 300 then creates the absolute values Eh and Ev of a second-order difference (step S307).

The evaluation apparatus 300 updates statistic $S_1$ (step S308). Specifically, if the positions of (Dh, Eh) are included in the blurring area, the evaluation apparatus 300 adds the value of Dh to the value of $S_1$ and stores the resulting value in $S_1$ to update the value of $S_1$ in step S308. Then, if the positions of (Dv, Ev) are included in the blurring area, the evaluation apparatus 300 adds the value of Dv to the value of $S_1$ and stores the resulting value in $S_1$ to update the value of $S_1$.

The evaluation apparatus 300 updates statistic $S_3$ (step S309). Specifically, if the positions of (Dh, Eh) are included in the noise area, the evaluation apparatus 300 adds the value of Dh to the value of $S_3$ and stores the resulting value in $S_3$ to update the value of $S_3$ in step S309. Then, if the positions of (Dv, Ev) are included in the noise area, the evaluation apparatus 300 adds the value of Dv to the value of $S_3$ and stores the resulting value in $S_3$ to update the value of $S_3$.

The evaluation apparatus 300 updates statistic $S_4$ according to equation (11) (step S310). The evaluation apparatus 300 also updates statistic $S_4$ according to equation (12) (step S311). The evaluation apparatus 300 proceeds to processing of a next pixel (step S312), after which the evaluation apparatus 300 causes the sequence to return to step S302.

To calculate deterioration features $FO_1$ and $FO_3$, of the original video data 131, the evaluation apparatus 300 executes the processing illustrated in FIG. 9 on the original video data 131. Deterioration features $FO_1$ and $FO_3$ are features corrected with statistic $S_4$. Similarly, to calculate deterioration features $FD_1$ and $FD_3$ of the deteriorated video data 132, the evaluation apparatus 300 executes the processing illustrated in FIG. 9 on the deteriorated video data 132. Deterioration features $FD_1$ and $FD_3$ are features corrected with statistic $S_4$.

The evaluation apparatus 300 subtracts deterioration feature $FO_1$ from deterioration feature $FD_1$ to obtain evaluation value $V_1$. The evaluation apparatus 300 subtracts deterioration feature $FO_3$ from deterioration feature $FD_3$ to obtain evaluation value $V_3$.

Next, effects provided by the evaluation apparatus 300 in the third embodiment will be described. The evaluation apparatus 300 calculates a basic feature from the original video data 131 and a basic feature from the deteriorated video data 132. The evaluation apparatus 300 decides, according to the basic feature of the original video data 131, whether the simultaneous distribution area is included in the pertinent area and calculates deterioration features $FO_1$ and $FO_3$ according to the decision result. Similarly, the evaluation apparatus 300 decides, according to the basic feature of the deteriorated video data 132, whether the simultaneous distribution area is included in the pertinent area and calculates deterioration features $FD_1$ and $FD_3$ according to the decision result. In addition, the evaluation apparatus 300 corrects deterioration features $FO_1$, $FO_3$, $FD_1$, and $FD_3$ with statistic $S_4$. The evaluation apparatus 300 then calculates evaluation values $V_1$ and $V_3$ from deterioration features $FO_1$, $FO_3$, $FD_1$, and $FD_3$. Thus, the evaluation apparatus 300 can more precisely calculate evaluation values for which blurring and noise are used as parameters by using the simultaneous distributions of the original video data 131 and deteriorated video data 132 to adjust values with statistic $S_4$.

Fourth Embodiment

Figure 10:
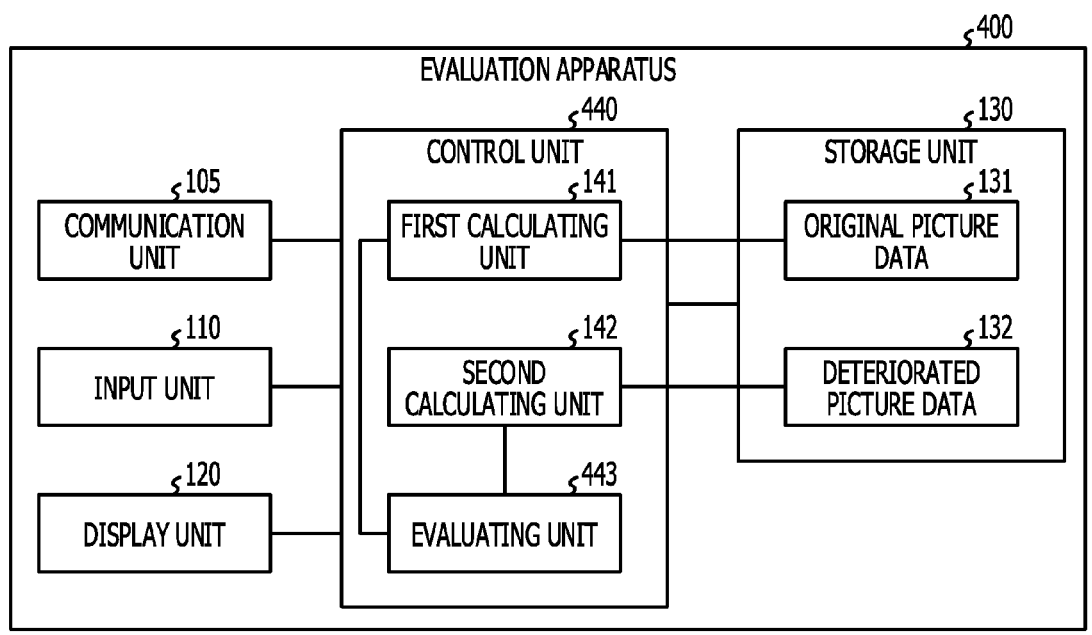
FIG. 10 is a functional block diagram illustrating the structure of an evaluation apparatus in a fourth embodiment.

An evaluation apparatus in a fourth embodiment will be described. FIG. 10 is a functional block diagram illustrating the structure of the evaluation apparatus in the fourth embodiment. As an example, the evaluation apparatus in the fourth embodiment calculates deterioration features related to contrast emphasis and contrast suppression to perform evaluation.

As illustrated in FIG. 10, the evaluation apparatus 400 includes a communication unit 105, an input unit 110, a display unit 120, a storage unit 130, and a control unit 440. The communication unit 105, input unit 110, display unit 120, and storage unit 130 are the same as in FIG. 1, so their descriptions will be omitted.

The control unit 440 includes a first calculating unit 141, a second calculating unit 142, and an evaluating unit 443.

The first calculating unit 141 is a processing unit that calculates a first-order difference and a second-order difference for each pixel of an image included in the original video data 131 to calculate the basic feature of the original video data 131, as with the first calculating unit 141 in FIG. 1. The first calculating unit 141 in the fourth embodiment outputs information about the basic feature of the original video data 131 to the evaluating unit 443.

The second calculating unit 142 is a processing unit that calculates a first-order difference and a second-order difference for each pixel of an image included in the deteriorated video data 132 to calculate the basic feature of the deteriorated video data 132, as with the second calculating unit 142 in FIG. 1. The second calculating unit 142 in the fourth embodiment outputs information about the basic feature of the deteriorated video data 132 to the evaluating unit 443.

The evaluating unit 443 calculates deterioration features related to contrast emphasis and contrast suppression and calculates evaluation values related to contrast emphasis and contrast suppression. The evaluating unit 443 newly uses statistic $S_5$, indicated in equations (15) and (16) below. Statistic $S_5$ relates to a degree of contrast emphasis and contrast suppression in a video. On the two-dimensional plane, illustrated in FIG. 4, of the basic feature, statistic $S_5$ represents an average value of a distribution obtained when a simultaneous distribution is projected on a plane parallel to a plane on which E is equal to D. Therefore, the larger the value of statistic $S_5$ is, the more the simultaneous distribution is shifted toward the upper right corner. By contrast, the smaller the value of statistic $S_5$ is, the more the simultaneous distribution is shifted toward the lower left corner.

$$S_5 \leftarrow S_5 + (Eh+Dh) \times Dh \qquad (15)$$

$$S_5 \leftarrow S_5 + (Ev+Dv) \times Dv \qquad (16)$$

A case in which the evaluating unit 443 calculates deterioration feature $FO_4$, related to contrast emphasis or contrast suppression, of the original video data 131 will be described. The evaluating unit 443 assigns the basic feature of the original video data 131 to equation (15) to update statistic $S_5$. The evaluating unit 443 also assigns the basic feature of the original video data 131 to equation (16) to update statistic $S_5$. The evaluating unit 443 repeatedly executes the above processing for all pixels of the original video data 131 and obtains final statistic $S_5$, which is averaged statistic $S_5$, as deterioration feature $FO_4$.

A case in which the evaluating unit 443 calculates deterioration feature $FD_4$, related to contrast emphasis or contrast suppression, of the deteriorated video data 132 will be described. The evaluating unit 443 assigns the basic feature of the deteriorated video data 132 to equation (15) to update statistic $S_5$. The evaluating unit 443 also assigns the basic feature of the deteriorated video data 132 to equation (16) to update statistic $S_5$. The evaluating unit 443 repeatedly executes the above processing for all pixels of the deteriorated video data 132 and obtains final statistic $S_5$, which is averaged statistic $S_5$, as deterioration feature $FD_4$.

Figure 11:
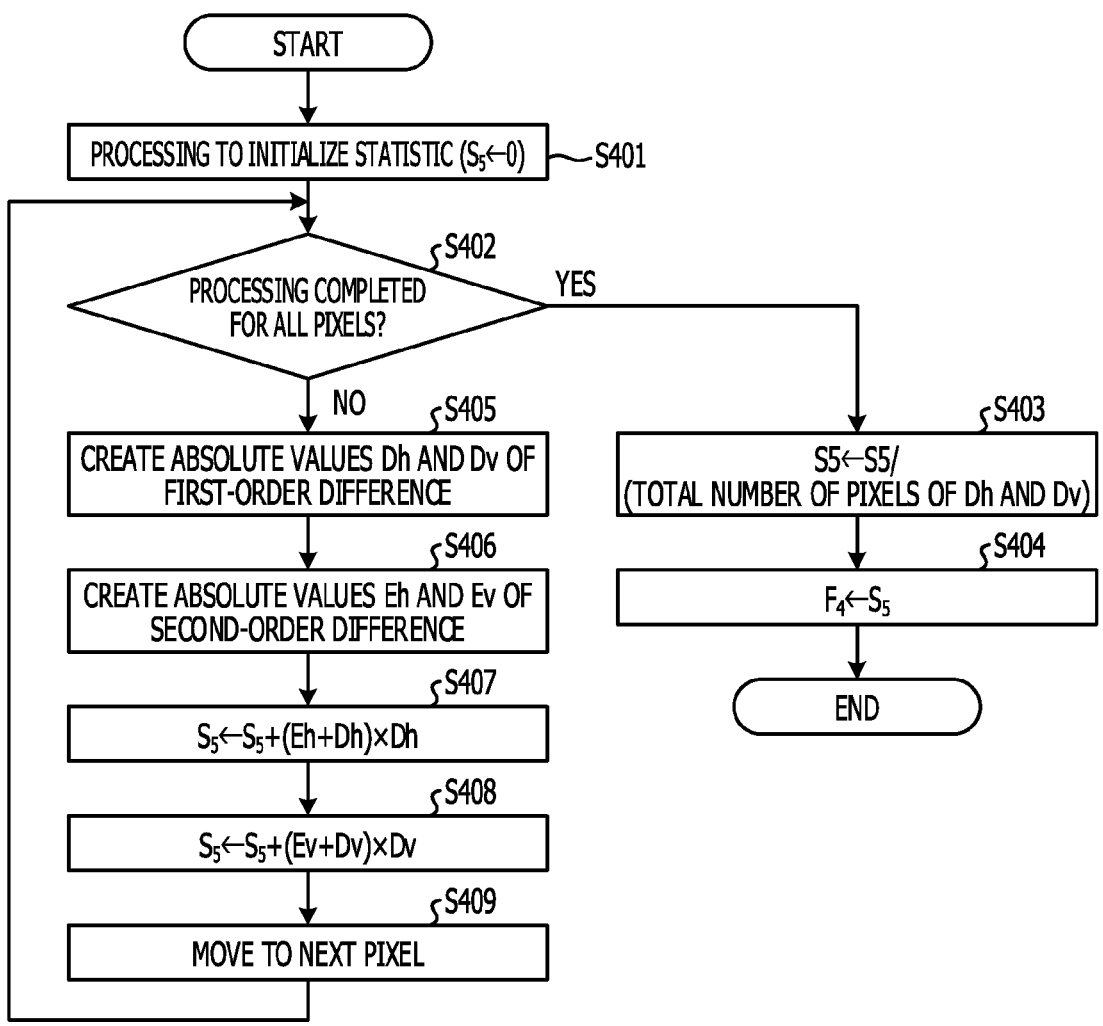
FIG. 11 is a flowchart illustrating a processing procedure for creating deterioration features related to contrast emphasis and contrast suppression.

Next, a processing procedure executed by the evaluation apparatus 400 in the fourth embodiment will be described. FIG. 11 is a flowchart illustrating a processing procedure for creating deterioration features related to contrast emphasis or contrast suppression. Processing for creating each deterioration feature from the original video data 131 and processing for creating each deterioration feature from the deteriorated video data 132 are the same.

As illustrated in FIG. 11, the evaluation apparatus 400 initializes statistics (step S401). In step S401, the evaluation apparatus 400 sets the value of statistic $S_5$ to 0. The evaluation apparatus 400 then decides whether processing has been completed for all pixels (step S402). If processing has been completed for all pixels (the result in step S402 is Yes), the evaluation apparatus 400 causes the sequence to proceed to step S403.

In step S403, the evaluation apparatus 400 updates the value of $S_5$ with a value obtained by dividing $S_5$ by a total number of pixels of Dh and Dv (step S403). The evaluation apparatus 400 sets statistic $S_5$ as deterioration feature $F_4$ (step S404).

If processing has not been completed for all pixels (the result in step S402 is No), the evaluation apparatus 400 creates the absolute values Dh and Dv of a first-order difference (step S405). The evaluation apparatus 400 then creates the absolute values Eh and Ev of a second-order difference (step S406).

The evaluation apparatus 400 updates statistic $S_5$ according to equation (15) (step S407). The evaluation apparatus 400 then updates statistic $S_5$ according to equation (16) (step S408). The evaluation apparatus 400 proceeds to processing of a next pixel (step S409), after which the evaluation apparatus 400 causes the sequence to return to step S402.

Next, effects provided by the evaluation apparatus 400 in the fourth embodiment will be described. The evaluation apparatus 400 calculates a basic feature from the original video data 131 and a basic feature from the deteriorated video data 132. The evaluation apparatus 400 calculates deterioration feature $FO_4$ related to contrast emphasis or contrast suppression according to the simultaneous distribution of the basic feature of the original video data 131. Similarly, the evaluation apparatus 400 calculates deterioration feature $FD_4$ related to contrast emphasis or contrast suppression according to the simultaneous distribution of the basic feature of the deteriorated video data 132. The evaluation apparatus 400 then calculates evaluation value $V_4$ from deterioration feature $FO_4$ and deterioration feature $FD_4$. Thus, the evaluation apparatus 400 can calculate an evaluation value for which contrast emphasis or contrast suppression is used as a parameter by using the simultaneous distributions of the original video data 131 and deteriorated video data 132.

For example, it can be found that as evaluation value $V_4$ becomes a larger positive value, the deteriorated video data 132 undergoes higher contrast emphasis than the original video data 131. It can also be found that as evaluation value $V_4$ becomes a smaller negative value, the deteriorated video data 132 undergoes higher contrast suppression than the original video data 131.

Fifth Embodiment

Figure 12:
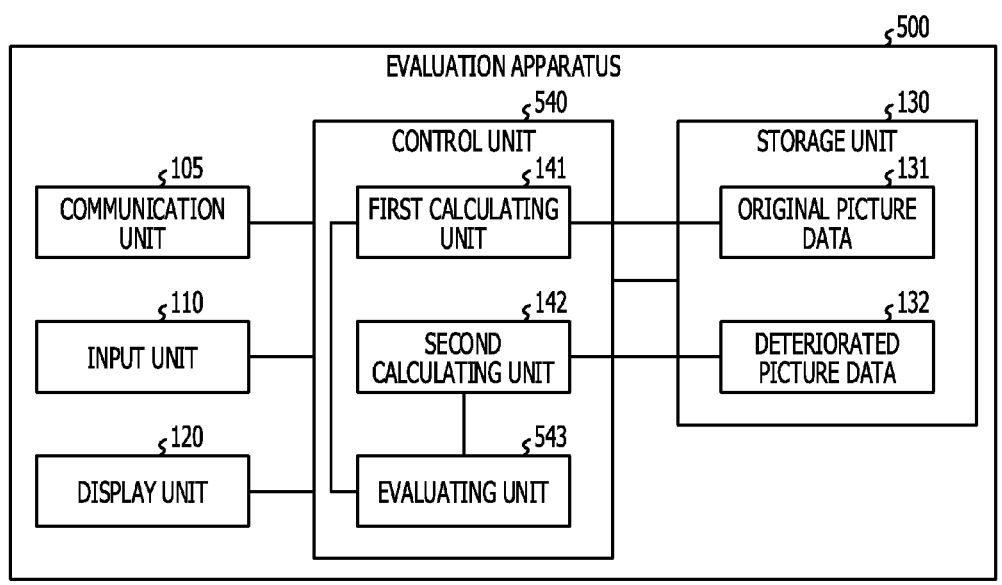
FIG. 12 is a functional block diagram illustrating the structure of an evaluation apparatus in a fifth embodiment.

An evaluation apparatus in a fifth embodiment will be described. FIG. 12 is a functional block diagram illustrating the structure of the evaluation apparatus in the fifth embodiment. As an example, the evaluation apparatus in the fifth embodiment calculates deterioration features related to blurring, block noise, and noise in consideration of changes with time in these features to perform evaluation.

As illustrated in FIG. 12, the evaluation apparatus 500 includes a communication unit 105, an input unit 110, a display unit 120, a storage unit 130, and a control unit 540. The communication unit 105, input unit 110, display unit 120, and storage unit 130 are the same as in FIG. 1, so their descriptions will be omitted.

The control unit 540 includes a first calculating unit 141, a second calculating unit 142, and an evaluating unit 543.

The first calculating unit 141 is a processing unit that calculates a first-order difference and a second-order difference for each pixel of an image included in the original video data 131 to calculate the basic feature of the original video data 131, as with the first calculating unit 141 in FIG. 1. The first calculating unit 141 in the fifth embodiment outputs information about the basic feature of the original video data 131 to the evaluating unit 543.

The second calculating unit 142 is a processing unit that calculates a first-order difference and a second-order difference for each pixel of an image included in the deteriorated video data 132 to calculate the basic feature of the deteriorated video data 132, as with the second calculating unit 142 in FIG. 1. The second calculating unit 142 in the fifth embodiment outputs information about the basic feature of the deteriorated video data 132 to the evaluating unit 543.

The evaluating unit 543 calculates deterioration features related to blurring, block noise, and noise in consideration of changes with time in these features to calculate evaluation values related to blurring, block noise, and noise with changes. The nature of deterioration corresponding to each deterioration feature is such that rapidly a moving scene is less likely to be noticeable than a slowly moving scene. In processing to update statistics $S_1$ to $S_3$ for each pixel, therefore, the evaluating unit 543 calculates a difference value between pixels in the time direction as a new feature T. If the feature T is large, the evaluating unit 543 reduces a value to be added to update statistics $S_1$ to $S_3$.

For example, the evaluating unit 543 calculates the feature T according to equations (17) and (18) below. In these equations, n indicates the current frame number, (x, y) indicates the current processing position, and F(n, x, y) indicates pixel values at the current processing position.

$$\mu(n, x, y) = \frac{1}{(2M+1)^2} \sum_{a=y-M}^{y+m} \sum_{b=x-M}^{x+M} F(n, a, b) \quad (17)$$

$$T(n,x,y) = |\mu(n,x,y) - \mu(n-1,x,y)| \quad (18)$$

In equation (17), $\mu(n, x, y)$ indicates the average pixel value of an area centered at the position (n, x, y) and M is a certain fixed value such as, for example, 4. Equation (18) calculates the absolute value of a difference between the average pixel value $\mu(n, x, y)$ obtained from equation (17) and the average pixel value $\mu(n-1, x, y)$ of the preceding frame. T(n, x, y) will be appropriately abbreviated as T.

The evaluating unit 543 uses the feature T to adjust a value to be added to update statistics $S_1$ to $S_3$. Specifically, the evaluating unit 543 adjusts the value to be added to update statistics $S_1$ to $S_3$ so that the larger the feature T is, the smaller the value is.

The evaluating unit 543 repeatedly executes the above processing for each pixel to update statistics $S_1$ to $S_3$. The evaluating unit 543 takes the final statistic $S_1$ as the deterioration feature of blurring. The evaluating unit 543 takes the final statistic $S_2$ as the deterioration feature of block noise. The evaluating unit 543 takes the final statistic $S_3$ as the deterioration feature of noise.

In the fifth embodiment, the deterioration feature, obtained from the original video data 131, of blurring is $FO_1$ and the deterioration feature, obtained from the deteriorated video data 132, of blurring is $FD_1$; the deterioration feature, obtained from the original video data 131, of block noise is $FO_2$ and the deterioration feature, obtained from the deteriorated video data 132, of block noise is $FD_2$; the deterioration feature, obtained from the original video data 131, of noise is $FO_3$ and the deterioration feature, obtained from the deteriorated video data 132, of noise is $FD_3$.

The evaluating unit 543 subtracts deterioration feature $FO_1$ from deterioration feature $FD_1$ to obtain evaluation value $V_1$ related to blurring. The evaluating unit 543 subtracts deterioration feature $FO_2$ from deterioration feature $FD_2$ to obtain evaluation value $V_2$ related to block noise. The evaluating unit 543 subtracts deterioration feature $FO_3$ from deterioration feature $FD_3$ to obtain evaluation value $V_3$ related to noise. When evaluation values $V_1$ to $V_3$ are positive, the larger evaluation values $V_1$ to $V_3$ are, the larger the degrees of their respective deteriorations are.

Figure 13:
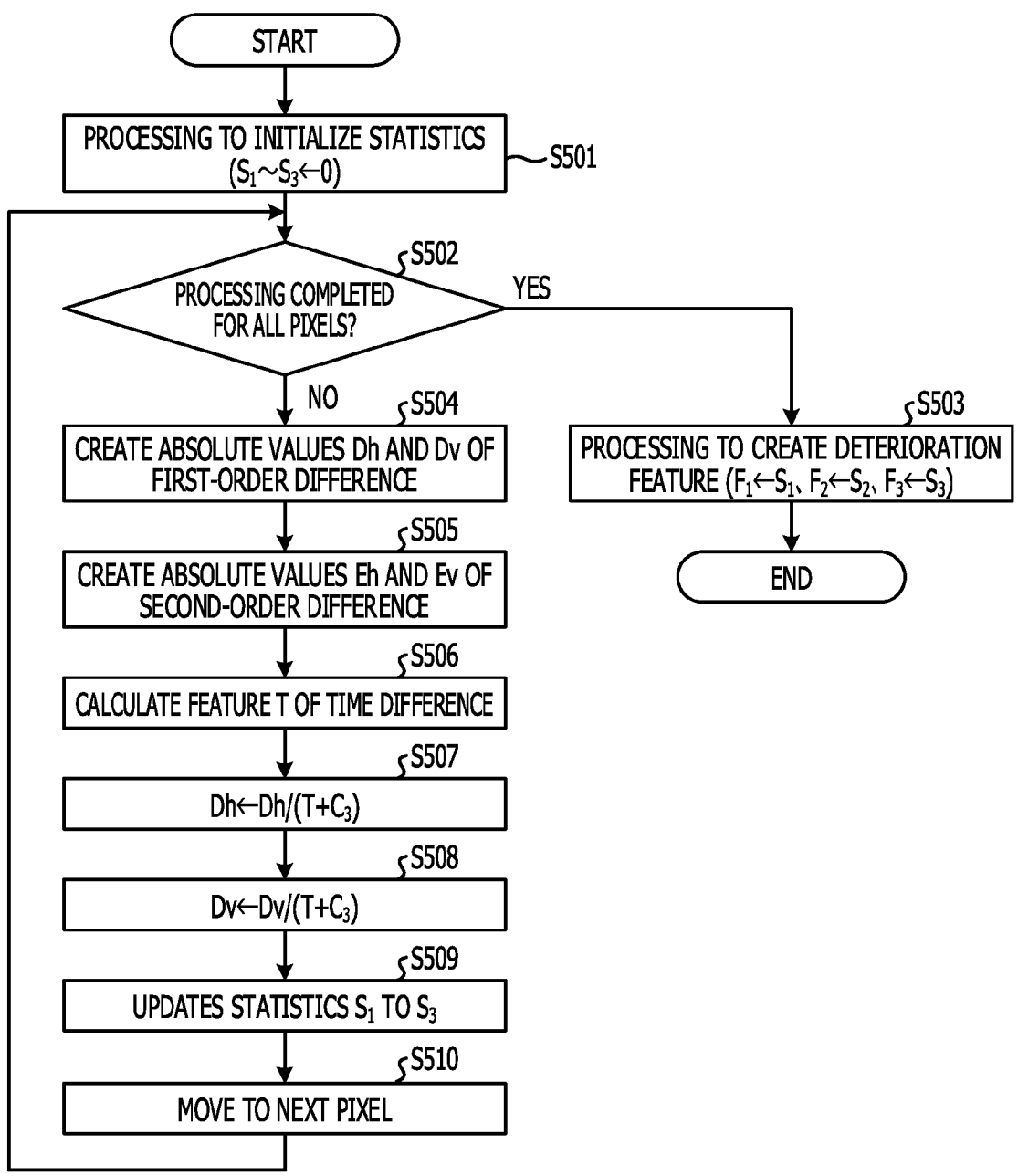
FIG. 13 is a flowchart illustrating a processing procedure for creating deterioration features related to blurring, block noise, and noise in consideration of the time direction.

Next, a processing procedure executed by the evaluation apparatus 500 in the fifth embodiment will be described. FIG. 13 is a flowchart illustrating a processing procedure for creating deterioration features related to blurring, block noise, and noise in consideration of the time direction. Processing for creating each deterioration feature from the original video data 131 and processing for creating each deterioration feature from the deteriorated video data 132 are the same.

As illustrated in FIG. 13, the evaluation apparatus 500 initializes statistics (step S501). In step S501, the evaluation apparatus 500 sets the values of statistics $S_1$ to $S_3$ to 0. The evaluation apparatus 500 then decides whether processing has been completed for all pixels (step S502).

If processing has been completed for all pixels (the result in step S502 is Yes), the evaluation apparatus 500 causes the sequence to proceed to step S503. In step S503, the evaluation apparatus 500 sets the value of statistic $S_1$ to deterioration feature $F_1$, sets the value of statistic $S_2$ to deterioration feature $F_2$, and sets the value of statistic $S_3$ to deterioration feature $F_3$ (step S503).

If processing has not been completed for all pixels (the result in step S502 is No), the evaluation apparatus 500 creates the absolute values Dh and Dv of a first-order difference (step S504). The evaluation apparatus 500 then creates the absolute values Eh and Ev of a second-order difference (step S505).

The evaluation apparatus 500 calculates the absolute value T of a time difference (step S506). The evaluation apparatus 500 then calculates $Dh/(T+C_3)$, $C_3$ being a constant, and updates the value of Dh with the calculated value (step S507). Similarly, the evaluation apparatus 500 calculates $Dv/(T+C_3)$ and updates the value of Dv with the calculated value (step S508).

The evaluation apparatus 500 updates $S_1$ to $S_3$ (step S509). Specifically, if the positions of (Dh, Eh) are included in the blurring area, the evaluation apparatus 500 adds the value of Dh to the value of $S_1$ and stores the resulting value in $S_1$ to update the value of $S_1$. Then, if the positions of (Dv, Ev) are included in the blurring area, the evaluation apparatus 500 adds the value of Dv to the value of $S_1$ and stores the resulting value in $S_1$ to update the value of $S_1$. The values of Dh and Dv to be added to $S_1$ are the values updated in steps S507 and S508.

If the positions of (Dh, Eh) are included in the block noise area, the evaluation apparatus 500 adds the value of Dh to the value of $S_2$ and stores the resulting value in $S_2$ to update the value of $S_2$. Then, if the positions of (Dv, Ev) are included in the block noise area, the evaluation apparatus 500 adds the value of Dv to the value of $S_2$ and stores the resulting value in $S_2$ to update the value of $S_2$. The values of Dh and Dv to be added to $S_2$ are the values updated in steps S507 and S508.

If the positions of (Dh, Eh) are included in the noise area, the evaluation apparatus 500 adds the value of Dh to the value of $S_3$ and stores the resulting value in $S_3$ to update the value of $S_3$. Then, if the positions of (Dv, Ev) are included in the noise area, the evaluation apparatus 500 adds the value of Dv to the value of $S_3$ and stores the resulting value in $S_3$ to update the value of $S_3$. The values of Dh and Dv to be added to $S_3$ are the values updated in steps S507 and S508.

The evaluation apparatus 500 proceeds to processing of a next pixel (step S510), after which the evaluation apparatus 500 causes the sequence to return to step S502.

To calculate deterioration features $FO_1$, $FO_2$, and $FO_3$, of the original video data 131, the evaluation apparatus 500 executes the processing illustrated in FIG. 13 on the original video data 131. Similarly, to calculate deterioration features $FD_1$, $FD_2$, and $FD_3$ of the deteriorated video data 132, the evaluation apparatus 500 executes the processing illustrated in FIG. 13 on the deteriorated video data 132. The evaluation apparatus 500 subtracts deterioration feature $FO_1$ from deterioration feature $FD_1$ to obtain evaluation value $V_1$. The evaluation apparatus 500 subtracts deterioration feature $FO_2$ from deterioration feature $FD_2$ to obtain evaluation value $V_2$. The evaluation apparatus 500 subtracts deterioration feature $FO_3$ from deterioration feature $FD_3$ to obtain evaluation value $V_3$.

Next, effects provided by the evaluation apparatus 500 in the fifth embodiment will be described. The evaluation apparatus 500 calculates a basic feature from the original video data 131 and a basic feature from the deteriorated video data 132. The evaluation apparatus 500 calculates the feature T in consideration of a change in pixels with time between two contiguous images and uses the calculated feature T to calculate deterioration features related to blurring, block noise, and noise to perform evaluation. Accordingly, evaluation values can be precisely calculated for a characteristic feature of a video.

In addition to the above processing by the evaluation apparatus 500, the pixel value itself at each position may be added to the basic feature. For example, the evaluating unit 543 may calculate the average value of pixels in an entire image as statistic $S_6$ to obtain it as a deterioration feature. The evaluating unit 543 may obtain statistic $S_6$ of the original video data 131 as deterioration feature $FO_5$. The evaluating unit 543 may obtain statistic $S_6$ of the deteriorated video data 132 as deterioration feature $FD_5$. Then, the evaluating unit 543 may subtract deterioration feature $FO_5$ from deterioration feature $FD_5$ to obtain evaluation value $V_5$. Evaluation value $V_5$ can be used to evaluate a change in brightness and a change in colors. A larger absolute value of evaluation value $V_5$ indicates a larger change in the brightness and colors of the deteriorated video data 132 from the original video data 131.

In the above examples of creating deterioration features, the entire area of an image has been handled as one unit. In creation of deterioration features, however, an image may be divided into small areas and each divided area may be handled as one unit. For example, only part of a video may undergo image deterioration. If a deterioration feature is obtained by handling the entire image area as one unit, the deterioration feature is averaged and partial deterioration may not be accurately obtained. If a deterioration feature is obtained for each partial area, however, partial deterioration in the video can be highly precisely detected.

Figure 14:
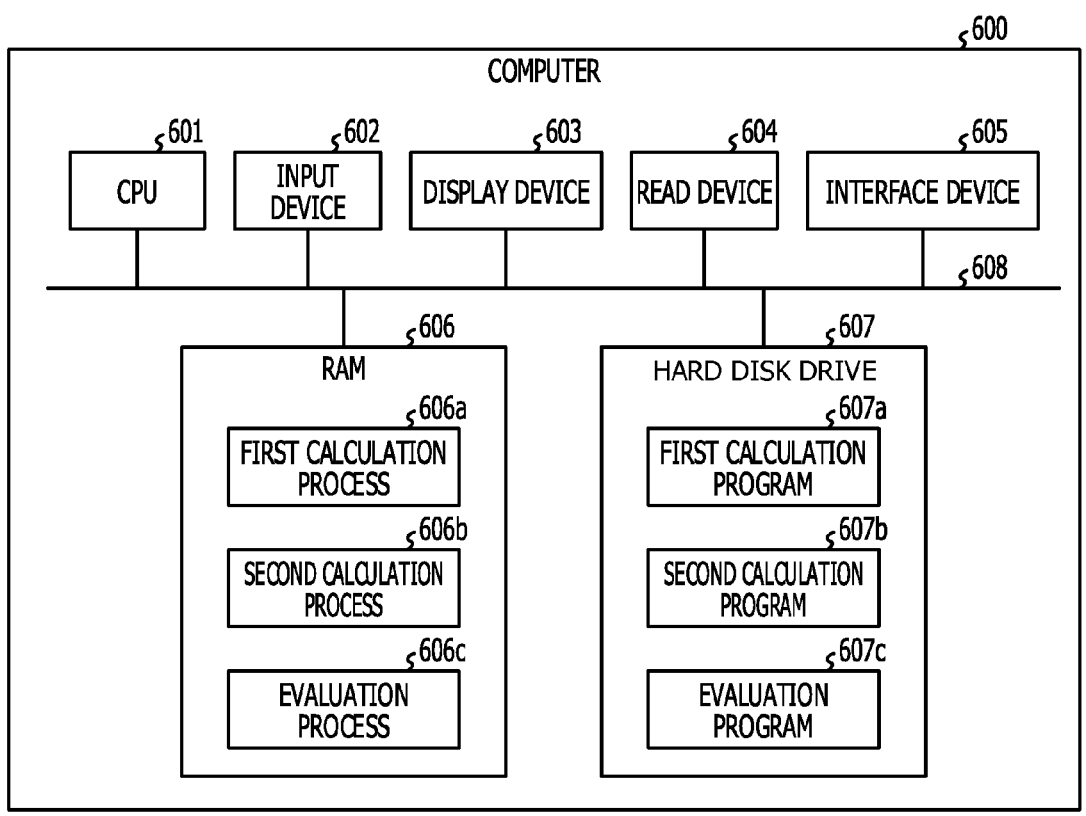
FIG. 14 illustrates an example of the structure of a computer that executes an evaluation program.
Figure 15:
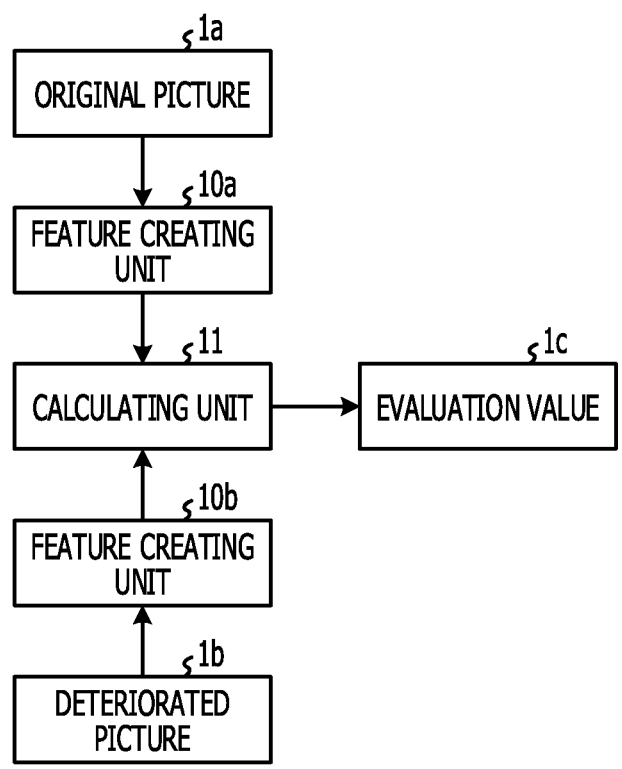
FIG. 15 illustrates a conventional RR method.

Next, an example of a computer will be described that executes a support program that implements functions similar to functions of the evaluation apparatuses described in the above embodiments. FIG. 14 illustrates an example of the structure of a computer that executes an evaluation program.

As illustrated in FIG. 14, the computer 600 includes a CPU 601 that executes various types of calculation processing, an input device 602 that accepts data transmitted from a user, and a display device 603. The computer 600 also includes a read device 604 that reads programs and the like from a storage medium and an interface device 605 that transmits and receives data to and from another computer through a network. The computer 600 also includes a RAM 606 that temporarily stores various types of information and a hard disk drive 607. The CPU 601, input device 602, display device 603, interface device 604, interface device 605, RAM 606, and hard disk drive 607 are connected to a bus 608.

The hard disk drive 607 includes a first calculation program 607a, a second calculation program 607b, and an evaluation program 607c. The CPU 601 reads out the programs 607a, 607b, and 607c and stores them in the RAM 606.

The first calculation program 607a functions as a first calculation process 606a. The second calculation program 607b functions as a second calculation process 606b. The evaluation program 607c functions as an evaluation process 606c.

For example, the first calculation process 606a corresponds to the first calculating unit 141, the second calculation process 606b corresponds to the second calculating unit 142, and the evaluation process 606c corresponds to the evaluating units 143, 243, 343, 443, and 543.

It is not a limitation that the programs 607a to 607c have been stored in the hard disk drive 607 in advance. For example, these programs may be stored on a flexible disk (FD), a compact disc-read-only memory (CD-ROM), a digital versatile disc (DVD), a magneto-optical disk, an integrated circuit (IC) card, or another transportable physical medium inserted into the computer 600. Then, the computer 600 may read out the programs 607a to 607c from these media.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An evaluation apparatus comprising:
    a memory; and
    a processor coupled to the memory and configured to
        calculate a first feature by calculating a first-order difference for a first image,
        calculate a second feature by calculating a second-order difference for the first image,
        calculate a third feature by calculating a first-order difference for a second image,
        calculate a fourth feature by calculating a second-order difference for the second image, and
        evaluate deterioration of the second image with respect to the first image according to a first simultaneous distribution that represents a first relationship between the first feature and the second feature and to a second simultaneous distribution that represents a second relationship between the third feature and the fourth feature;
        calculate a first value based on the first relationship between the first feature and the second feature, the first value indicating a characteristic feature of the first image, calculate a second value based on the second relationship between the third feature and the fourth feature, the second value indicating a characteristic feature of the second image, and evaluate the deterioration of the second image according to the first value and the second value.

2. The evaluation apparatus according to claim 1, wherein the processor is configured to evaluate the deterioration of the second image according to a difference between the first value and the second value.

3. The evaluation apparatus according to claim 2, wherein the processor is further configured to:

calculate a third value according to a pixel value of the first image, calculate a fourth value according to a pixel value of the second image, and evaluate the deterioration of the second image according to a difference between the third value and the fourth value.

4. The evaluation apparatus according to claim 1, wherein the first image is included in first video data, the second image is included in second video data, and the processor is configured to:

create differential information about the first image and a third image, which is in a frame previous to a frame in which the first image is included in the first video data, correct the first value according to the differential information, create another differential information about the second image and a fourth image, which is in a frame previous to a frame in which the second image is included in the second video data, correct the second value according to the another differential information, and evaluate the deterioration of the second image according to a difference between the first value that has been corrected and the second value that has been corrected.

5. An evaluation apparatus comprising:

a memory; and a processor coupled to the memory and configured to:

acquire first image data, calculate, for each of a plurality of first pixels in the first image data, a first first-order difference value and a first second-order difference value in a direction in which the plurality of first pixels are arrayed, according to a first pixel value of the each of the plurality of first pixels, calculate a first value of the first image data according to the first first-order difference value and the first second-order difference value of the each of the plurality of first pixels, the first value indicating an amount of a characteristic feature of the first image data about a first element, acquire second image data to be compared with the first image data, calculate, for each of a plurality of second pixels in the second image data, a second first-order difference value and a second second-order difference value in the array direction according to a second pixel value of the each of the plurality of second pixels, calculate a second value of the second image data according to the second first-order difference value and the second second-order difference value of the each of the plurality of second pixels, the second value indicating another amount of another characteristic feature of the second image data about the first element, and calculate, for the first element, an amount of difference between the first image data and the second image data, according to the first value and the second value.

6. The evaluation apparatus according to claim 5, wherein the processor is further configured to:

calculate a third value indicating an amount of a characteristic feature of the first image data about a second element according to the first first-order difference value and the first second-order difference value of the each of the plurality of first pixels, the second element being different from the first element, calculate a fourth value indicating another amount of another characteristic feature of the second image data about the second element according to the second first-order difference value and the second second-order difference value of the each of the plurality of second pixels, and calculate, for the second element, another amount of change between the first image data and the second image data, according to the third value and the fourth value.

7. The evaluation apparatus according to claim 5, wherein the memory stores first range information determined by a combination of a range of values concerning a first-order difference value and a range of values concerning a second-order difference value, second range information different from the first range information, and information indicating that the first range information has a characteristic feature related to the first element; and wherein the processor is further configured to:

decide, for the each of the plurality of first pixels, which of the first range information and the second range information includes the first first-order difference value and the first second-order difference value, calculate, if the first range information includes the first first-order difference value and the first second-order difference value, the first value for the each of the plurality of first pixels by cumulatively adding a prescribed value, decide, for the each of the plurality of second pixels, which of the first range information and the second range information includes the second first-order difference value and the second second-order difference value, and calculate, if the first range information includes the second first-order difference value and the second second-order difference value, the second value for the each of the plurality of second pixels by cumulatively adding the prescribed value.

8. The evaluation apparatus according to claim 7, wherein the processor is further configured to:

calculate a third value indicating an amount of a characteristic feature of the first image data about a second element according to the first first-order difference value and the first second-order difference value of the each of the plurality of first pixels, the second element being different from the first element, calculate a fourth value indicating an amount of a characteristic feature of the second image data about the second element according to the second first-order difference value and the second second-order difference value of the each of the plurality of second pixels, and calculate, for the second element, another amount of difference between the first image data and the second image data, according to the third value and the fourth value.

9. The evaluation apparatus according to claim 8, wherein the memory stores third range information determined by a combination of a range of values concerning a first-order difference value and a range of values concerning a second-order difference value, fourth range information different from the third range information, and information indicating that the third range information has a characteristic feature related to the second element; and
   wherein the processor is further configured to:
      decide, for the each of the plurality of first pixels, which of the third range information and the fourth range information includes the first first-order difference value and the first second-order difference value,
      calculate, if the third range information includes the first first-order difference value and the first second-order difference value, the third value for the each of the plurality of first pixels by cumulatively adding a prescribed value,
      decide, for the each of the plurality of second pixels, which of the third range information and the fourth range information includes the second first-order difference value and the second second-order difference value, and
      calculate, if the third range information includes the second first-order difference value and the second second-order difference value, the fourth value for the each of the plurality of second pixels by cumulatively adding the prescribed value.

10. The evaluation apparatus according to claim 5, wherein the first image data is included in first video data, and
   wherein the second image data is included in second video data, which is obtained by converting the first image data, the second image data being data corresponding to a frame number that is the same as a frame number of the first image data in the first video data.

11. An evaluation method, comprising:
   calculating a first feature by calculating a first-order difference for a first image;
   calculating a second feature by calculating a second-order difference for the first image;
   calculating a third feature by calculating a first-order difference for a second image;
   calculating a fourth feature by calculating a second-order difference for the second image;
   evaluating, by a processor, deterioration of the second image with respect to the first image according to a first simultaneous distribution that represents a first relationship between the first feature and the second feature and to a second simultaneous distribution that represents a second relationship between the third feature and the fourth feature;
   calculating a first value based on the first relationship between first feature and the second feature, the first value indicating a characteristic feature of the first image; and
   calculating a second value based on the second relationship between the third feature and the fourth feature, the second value indicating a characteristic feature of the second image; and
   wherein the evaluating evaluates the deterioration of the second image according to the first value and the second value.

12. The evaluation method according to claim 11, wherein the evaluating evaluates the deterioration of the second image according to a difference between the first value and the second value.

13. The evaluation method according to claim 12, further comprising:
   calculating a third value according to a pixel value of the first image; and
   calculating a fourth value according to a pixel value of the second image, and
   wherein evaluating evaluates the deterioration of the second image according to a difference between the third value and the fourth value.

14. The evaluation method according to claim 11, wherein the first image is included in first video data,
   wherein the second image is included in second video data,
   wherein the evaluation method further comprises:
      creating differential information about the first image and a third image, which is in a frame previous to a frame in which the first image is included in the first video data;
      correcting the first value according to the differential information;
      creating another differential information about the second image and a fourth image, which is in a frame previous to a frame in which the second image is included in the second video data, and
      correcting the second value according to the another differential information, and
   wherein the evaluating evaluates the deterioration of the second image according to a difference between the first value that has been corrected and the second value that has been corrected.

* * * * *